US008924542B1

(12) United States Patent
Gabrielson et al.

(10) Patent No.: US 8,924,542 B1
(45) Date of Patent: Dec. 30, 2014

(54) METHODS AND APPARATUS FOR SCALABLE PRIVATE SERVICES

(75) Inventors: Jacob Gabrielson, Seattle, WA (US); Eric J. Brandwine, Haymarket, VA (US)

(73) Assignee: Amazon Technologies, Inc., Reno, NV (US)

( * ) Notice: Subject to any disclaimer, the term of this patent is extended or adjusted under 35 U.S.C. 154(b) by 800 days.

(21) Appl. No.: 13/149,516

(22) Filed: May 31, 2011

(51) Int. Cl.
*G06F 15/173* (2006.01)
*H04L 12/46* (2006.01)

(52) U.S. Cl.
CPC ................................ *H04L 12/4641* (2013.01)
USPC ............................ 709/224; 709/225; 709/226

(58) Field of Classification Search
CPC ............ H04L 12/4641; H04L 63/0272; H04L 2012/5621
USPC .................................................. 709/224–226
See application file for complete search history.

(56) References Cited

U.S. PATENT DOCUMENTS

| | | | |
|---|---|---|---|
| 6,240,402 B1 | 5/2001 | Lynch-Aird | |
| 7,325,140 B2 | 1/2008 | Carley | |
| 7,505,962 B2 | 3/2009 | Shariff et al. | |
| 7,937,438 B1 | 5/2011 | Miller et al. | |
| 7,945,640 B1 | 5/2011 | VanTine | |
| 7,953,865 B1 | 5/2011 | Miller et al. | |
| 7,991,859 B1 | 8/2011 | Miller et al. | |
| 8,117,289 B1 | 2/2012 | Miller et al. | |
| 8,126,722 B2 * | 2/2012 | Robb et al. | 705/1.1 |
| 8,131,852 B1 | 3/2012 | Miller et al. | |
| 8,201,237 B1 | 6/2012 | Doane et al. | |
| 8,224,971 B1 | 7/2012 | Miller et al. | |
| 8,230,050 B1 | 7/2012 | Brandwine et al. | |
| 8,239,538 B2 | 8/2012 | Zhang et al. | |
| 8,312,129 B1 | 11/2012 | Miller et al. | |
| 8,345,692 B2 | 1/2013 | Smith | |
| 8,352,941 B1 | 1/2013 | Protopopov et al. | |
| 8,402,127 B2 * | 3/2013 | Solin | 709/223 |
| 8,494,481 B1 * | 7/2013 | Bacco et al. | 455/404.1 |
| 2003/0084104 A1 | 5/2003 | Salem et al. | |
| 2005/0198244 A1 | 9/2005 | Eilam et al. | |
| 2010/0057831 A1 | 3/2010 | Williamson | |

(Continued)

OTHER PUBLICATIONS

U.S. Appl. No. 13/239,159, filed Sep. 21, 2011; Eric J. Brandwine.

(Continued)

*Primary Examiner* — Mohamed Wasel
(74) *Attorney, Agent, or Firm* — Robert C. Kowert; Meyertons, Hood, Kivlin, Kowert & Goetzel, P.C.

(57) ABSTRACT

Methods and apparatus for providing scalable private services in service provider networking environments. A service provider that provides a large, public, multi-tenant implementation of a web service to multiple customers via a public API endpoint may allow a customer to request the establishment of a private implementation of the service. In response, a service private instance may be automatically and/or manually established for the customer that provides a private API endpoint to the service and that is at least in part implemented on single-tenant hardware that is not shared with other customers. The service private instance may initially be implemented as a relatively small scale and possibly limited implementation of the service when compared to the service public instance. As the needs of the customer grow, the service private instance may be automatically and/or manually scaled up from the initial implementation.

34 Claims, 13 Drawing Sheets

(56) References Cited

U.S. PATENT DOCUMENTS

| | | |
|---|---|---|
| 2010/0246443 A1 | 9/2010 | Cohn et al. |
| 2011/0320598 A1* | 12/2011 | Solin .............................. 709/225 |
| 2011/0320605 A1 | 12/2011 | Kramer et al. |
| 2012/0084113 A1 | 4/2012 | Brandwine et al. |
| 2012/0084443 A1 | 4/2012 | Theimer et al. |
| 2013/0254868 A1* | 9/2013 | Khasnabish .................... 726/11 |

OTHER PUBLICATIONS

U.S. Appl. No. 14/109,535, filed Dec. 17, 2013, Bashuman Deb.

* cited by examiner

METHODS AND APPARATUS FOR SCALABLE PRIVATE SERVICES

BACKGROUND

Many companies and other organizations operate computer networks that interconnect numerous computing systems to support their operations, such as with the computing systems being co-located (e.g., as part of a local network) or instead located in multiple distinct geographical locations (e.g., connected via one or more private or public intermediate networks). For example, data centers housing significant numbers of interconnected computing systems have become commonplace, such as private data centers that are operated by and on behalf of a single organization, and public data centers that are operated by entities as businesses to provide computing resources to customers. Some public data center operators provide network access, power, and secure installation facilities for hardware owned by various customers, while other public data center operators provide "full service" facilities that also include hardware resources made available for use by their customers. However, as the scale and scope of typical data centers has increased, the task of provisioning, administering, and managing the physical computing resources has become increasingly complicated.

The advent of virtualization technologies for commodity hardware has provided benefits with respect to managing large-scale computing resources for many customers with diverse needs, allowing various computing resources to be efficiently and securely shared by multiple customers. For example, virtualization technologies may allow a single physical computing machine to be shared among multiple users by providing each user with one or more virtual machines hosted by the single physical computing machine, with each such virtual machine being a software simulation acting as a distinct logical computing system that provides users with the illusion that they are the sole operators and administrators of a given hardware computing resource, while also providing application isolation and security among the various virtual machines. Furthermore, some virtualization technologies are capable of providing virtual resources that span two or more physical resources, such as a single virtual machine with multiple virtual processors that spans multiple distinct physical computing systems.

As another example, virtualization technologies may allow data storage hardware to be shared among multiple users by providing each user with a virtualized data store which may be distributed across multiple data storage devices, with each such virtualized data store acting as a distinct logical data store that provides users with the illusion that they are the sole operators and administrators of the data storage resource.

Web Services

The conventional Web model allows clients to access Web resources (e.g., applications, services, and data) via an HTTP client program, such as a Web browser. A technology referred to as Web services has been developed to provide programmatic access to Web resources. Web services may be used to provide programmatic access to Web resources including technology platforms (e.g., applications and services) and data (e.g., product catalogs and other databases) hosted on Web-connected computers such as Web server systems via a Web service interface. Generally speaking, a Web service interface may be configured to provide a standard, cross-platform API (Application Programming Interface) for communication between a client requesting some service to be performed and the service provider. In some implementations, a Web service interface may be configured to support the exchange of documents or messages including information describing the service request and response to that request. Such documents, or messages, may be exchanged using standardized Web protocols, such as the Hypertext Transfer Protocol (HTTP), for example, and may be formatted in a platform-independent data format, such as eXtensible Markup Language (XML), for example.

Figure 1:
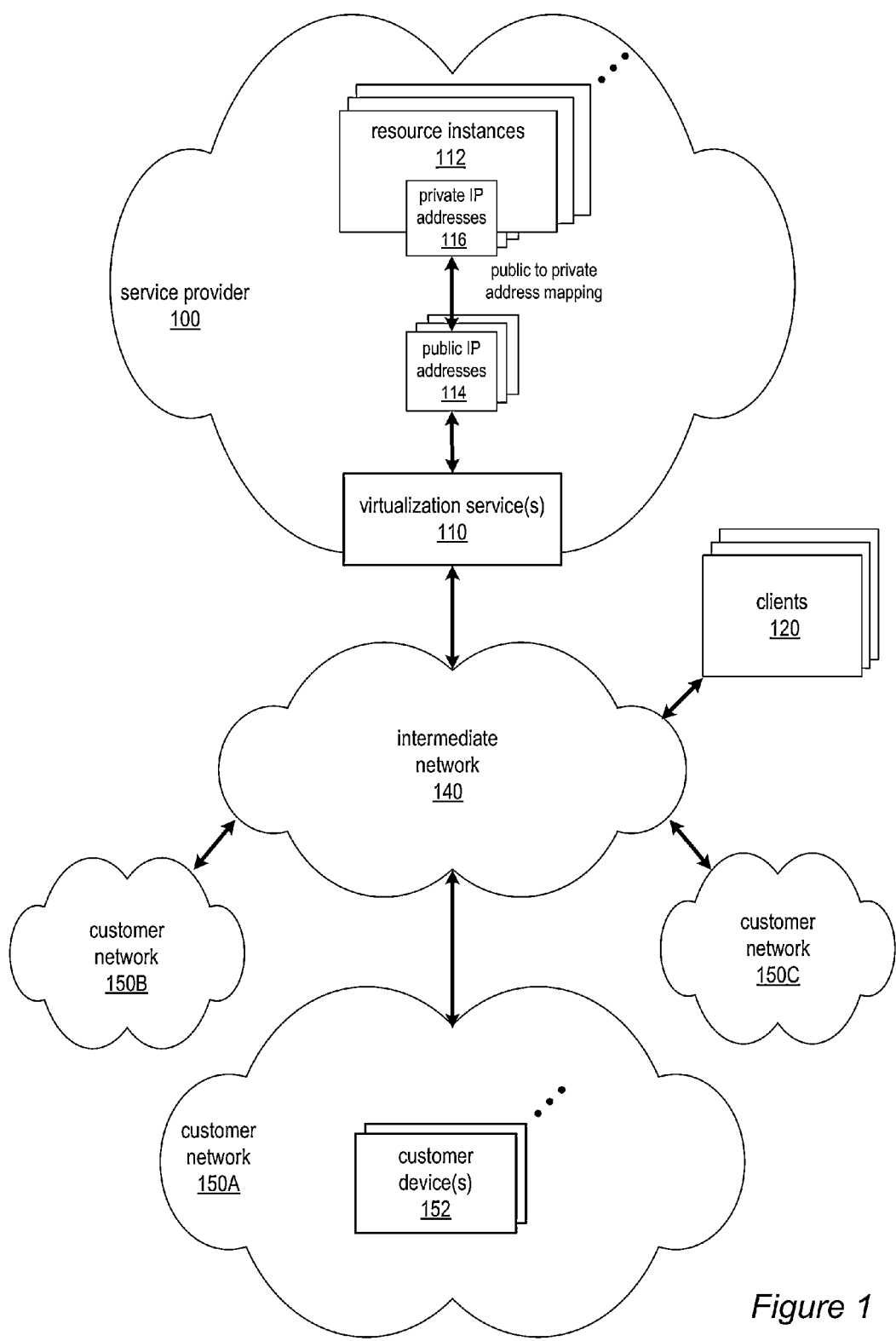
FIG. 1 illustrates an example service provider networking environment, according to at least some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION OF EMBODIMENTS

Various embodiments of methods and apparatus for providing scalable private services in service provider networking environments are described. A service provider may provide a large, public, multi-tenant implementation of a web service to multiple customers via a public API (Application Programming Interface) endpoint to the service. Using an embodiment of the scalable private services methods and apparatus as described herein, the service provider may allow a customer to request the establishment of a private implementation of the service. In response to the request, a service private instance may be automatically and/or manually established for the customer to the service and that is at least in part implemented on single-tenant hardware that is not shared with other customers. In addition, a private API endpoint may be provided for the service private instance. While the service private instance may conform to the same service API as the service public instance, the service private instance may at least initially be implemented differently than the multi-tenant service public instance, for example as a relatively small scale and possibly limited implementation of the service when compared to the multi-tenant service public instance. As the needs of the customer grow, the service private instance may be automatically and/or manually scaled up from the initial implementation. The service private instance may also be scaled down if the needs of the customer decrease. The scaling up or down of the service private instance may be performed transparently from the customer's perspective.

Embodiments of the methods and apparatus for providing scalable private services may, for example, be implemented in the context of a service provider that provides virtualized computing resources to multiple customers. A service provider may provide resource virtualization to the customers via one or more virtualization services that allow the customers to purchase, rent, or otherwise obtain instances of virtualized resources, including but not limited to computation and storage resources, implemented on devices within a service provider network or networks in one or more service provider data centers. In a typical service provider network, at least some of the virtualized resources provided by a virtualization service are implemented on multi-tenant devices. A multi-tenant device is a device that is shared by processes or data belonging to two or more of the customers. For example, in a hardware virtualization service, a single physical computing machine may be shared among multiple customers by providing each customer with one or more virtual machines hosted by the single physical computing machine. As another example, in a storage virtualization service, each customer's virtualized data store may be distributed across multiple data storage devices, with a given storage device storing portions of data for two or more customers. Each virtualization service may provide a standard public interface, for example a public web services API, via which the customers and clients of the customers may access the customers' respective virtualized resources.

A service provider may provide virtualized private networks that enable a customer to connect existing infrastructure on the customer's network to a set of logically isolated service provider resource instances, and to extend management capabilities such as security services, firewalls, and intrusion detection systems to include their service provider resource instances. However, at least some of the underlying physical devices in a virtualized private network may still be shared with other customers of the service provider. A service provider may also allow customers to establish a private API endpoint for a virtualization service in the customer's virtualized private network. However, while allowing the customer to establish a private API endpoint to the virtualization service may provide a degree of logical isolation of the customer's virtualized resources provided by the virtualization service, the customer's resource instances may still be implemented by the virtualization service on multi-tenant hardware that is shared with other customers.

At least some customers of a service provider may desire or require physical isolation of the customers' data and/or processes on a service provider network. That is, a customer may want to take advantage of cost or other benefits that may be provided via the virtualization services provided by a service provider, but for one or more reasons (e.g., regulatory, security, and/or performance reasons), may not want to share at least some of the underlying physical resources with other customers.

Embodiments of the methods and apparatus for providing scalable private services may be applied in service provider networks to provide physical isolation for a customer's resources provided through a virtualization service. In at least some embodiments, a customer may request a private instance of a virtualization service, for example when establishing a private API endpoint to the virtualization service through the customer's virtualized private network. In response to the request, single-tenant hardware and other resources may be automatically and/or manually configured to support a private instance of the virtualization service according to the customer's needs. The customer, and in some cases the customer's clients, may then access the customer's virtualized resources provided via the service private instance through the private API endpoint to the private instance of the service.

In at least some embodiments, the private instance of the service, also referred to as a service private instance, may be initialized as a reduced or minimal implementation of the virtualization service. As the needs of the customer grow, the service private instance may be manually and/or automatically scaled up by reconfiguring the service private instance, for example by replacing or upgrading one or more software and/or hardware components of the service private instance, adding additional hardware and/or software components to the service private instance, and/or implementing additional features of the virtualization service in the service private instance, to handle the increase in demand on the service private instance. Conversely, the service private instance may be scaled down if the needs of the customer decrease.

As an example, when mounting a private API endpoint to a virtualization service such as a storage virtualization service in their virtualized private network, a customer may specify that they want the virtualization service to provide physically private resources, and not virtualized resources implemented on multi-tenant devices. Using a storage virtualization service as an example, this may involve creating a new installation of the storage virtualization service, including dedicated computing devices, web servers, storage nodes, network infrastructure, and so on that are necessary to implement an instance of the storage service. In at least some embodiments, an initial private instance of the storage virtualization service may be implemented that provides the storage virtualization service API interface, but which is smaller, simpler, relatively easier to deploy, and possibly more expensive per unit capacity than a typical public implementation of the storage virtualization service intended to support multiple customers via multi-tenant hardware. For example, the customer's virtualized data volume may initially be supportable via MySQL database technology or other relatively small-scale data storage technology, while the public implementation uses a different data storage technology that supports much larger data volumes. As the customer grows, the low-scale, relatively expensive per unit capacity implementation may be transparently reconfigured to provide a higher-scale, less expensive per unit capacity implementation. For example, as the customer's data volume grows, the initial smaller-scale data storage technology used in the customer's private instance may be reconfigured by adding, replacing, or upgrading one or more components to scale up to a data storage technology that supports larger data volumes, which may be but is not necessarily the data storage technology used in the public instance. This scaling up of the customer's private implementation of the service may happen more than once as usage increases over time, and may happen in reverse, for example scaling down the service private instance in response to a detected or anticipated decrease in usage.

Example Service Provider Networking Environments

This section describes example service provider network environments in which embodiments of the methods and apparatus for scalable private services may be implemented to provide private, single-tenant instances of virtualization services to at least some customers. However, these example service provider network environments are not intended to be limiting; embodiments of the methods and apparatus for scalable private services may be generally applied in service provider network environments to provide private, single-tenant instances of various web services to at least some customers.

FIG. 1 illustrates an example service provider networking environment, according to at least some embodiments. A service provider 100 may provide resource virtualization to customers via one or more virtualization services 110 that allow customers 150 to purchase, rent, or otherwise obtain instances 112 of virtualized resources, including but not limited to computation and storage resources, implemented on devices within a service provider network or networks in one or more service provider data centers. Private IP addresses 116 may be associated with the resource instances 112; the private IP addresses are the internal network addresses of the resource instances 112 on the service provider 100 network. The service provider 100 may also provide public IP addresses 114 and/or public IP address ranges (e.g., Internet Protocol version 4 (IPv4) or Internet Protocol version 6 (IPv6) addresses) that customers 150 may obtain from the provider 100.

Conventionally, the service provider 100, via the virtualization services 110, may allow a customer (e.g., customer 150A) to dynamically associate at least some public IP addresses 114 assigned to the customer with particular resource instances 112 assigned to the customer. The service provider 100 may also allow the customer to remap a public IP address 114, previously mapped to one virtualized computing resource instance 112 owned by the customer, to another virtualized computing resource instance 112 that the customer owns. Using the virtualized computing resource instances 112 and public IP addresses 114 provided by the service provider 100, a customer 150A may, for example, implement customer-specific applications and present the customer's applications on an intermediate network 140, such as the Internet. A client 120 on the intermediate network 140 may then generate traffic to a destination public IP address 114 published by the customer 150A; the traffic is routed to the service provider data center, and at the data center is routed, via a network substrate, to the private IP address 116 of the virtualized computing resource instance 112 currently mapped to the destination public IP address 114. Similarly, response traffic from the virtualized computing resource instance 112 may be routed via the network substrate back onto the intermediate network 140 to the source client 120.

Private IP addresses, as used herein, refer to the internal network addresses of resource instances in a service provider network. Private IP addresses are only routable within the service provider network. Network traffic originating outside the service provider network is not directly routed to private IP addresses; instead, the traffic uses public IP addresses that are mapped to the resource instances. The service provider network may include network devices or appliances that provide network address translation (NAT) or similar functionality to perform the mapping from public IP addresses to private IP addresses and vice versa.

Public IP addresses, as used herein, are Internet routable network addresses that are assigned to resource instances, either by the service provider or by the customer. Traffic routed to a public IP address is translated, for example via 1:1 network address translation (NAT), and forwarded to the respective private IP address of a resource instance.

Some public IP addresses may be assigned by the service provider network infrastructure to particular resource instances; these public IP addresses may be referred to as standard public IP addresses, or simply standard IP addresses. In at least some embodiments, the mapping of a standard IP address to a private IP address of a resource instance is the default launch configuration for all a resource instance types.

At least some public IP addresses may be allocated to or obtained by customers of the service provider; a customer may then assign their allocated public IP addresses to particular resource instances allocated to the customer. These public IP addresses may be referred to as customer public IP addresses, or simply customer IP addresses. Instead of being assigned by the service provider network to resource instances as in the case of standard IP addresses, customer IP addresses may be assigned to resource instances by the customers, for example via an API provided by the service provider. Unlike standard IP addresses, customer IP Addresses are allocated to customer accounts and can be remapped to other resource instances by the respective customers as necessary or desired. A customer IP address is associated with a customer's account, not a particular resource instance, and the customer controls that IP address until the customer chooses to release it. Unlike conventional static IP addresses, customer IP addresses allow the customer to mask resource instance or availability zone failures by remapping the customer's public IP addresses to any resource instance associated with the customer's account. The customer IP addresses, for example, enable a customer to engineer around problems with the customer's resource instances or software by remapping customer IP addresses to replacement resource instances.

Figure 2:
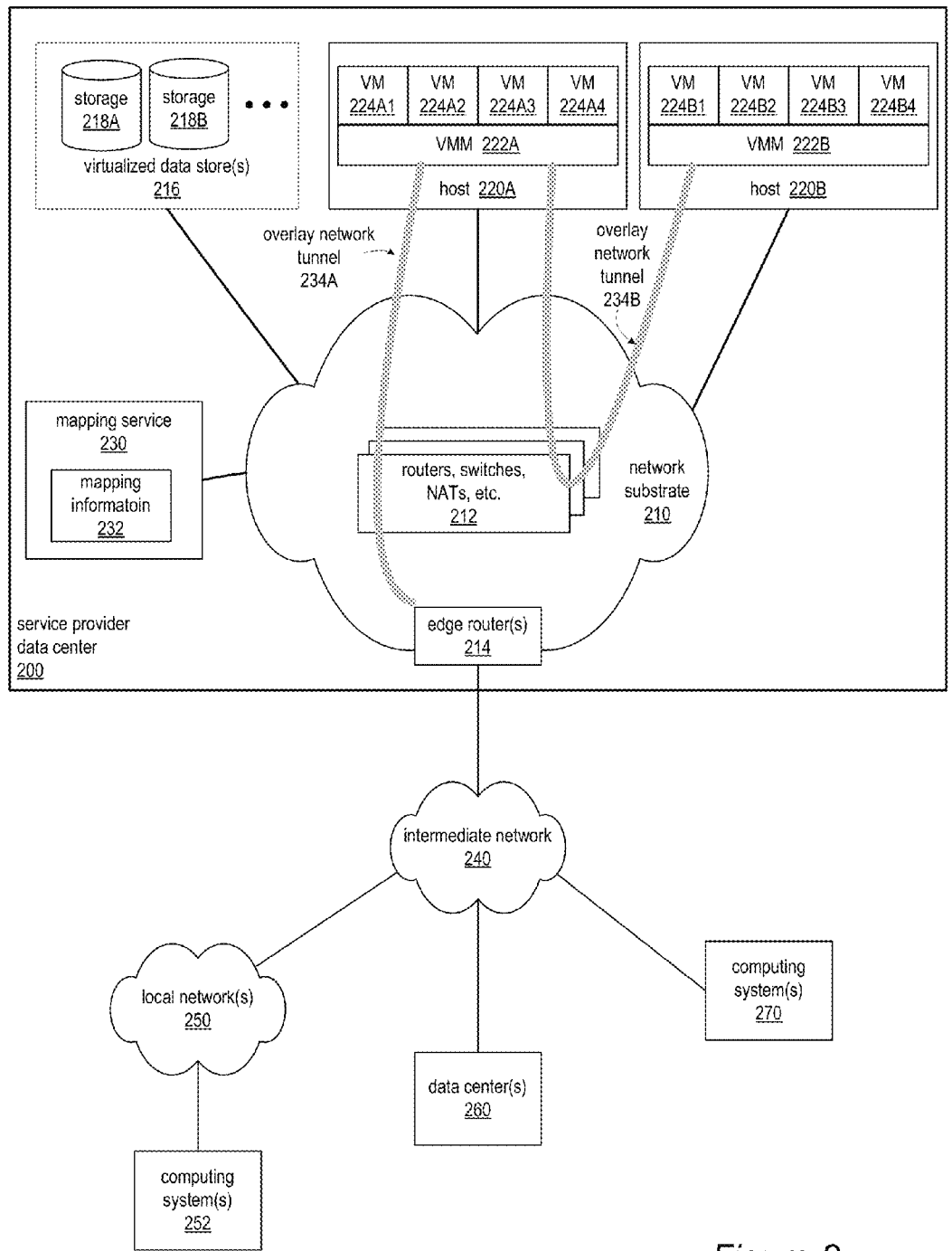
FIG. 2 illustrates an example service provider data center that implements an overlay network on a network substrate using IP tunneling technology, according to some embodiments.

FIG. 2 illustrates an example service provider data center that implements an overlay network on a network substrate using IP tunneling technology, according to some embodiments. A service provider data center 200 may include a network substrate that includes networking devices 212 such as routers, switches, network address translators (NATs), and so on. At least some embodiments may employ an Internet Protocol (IP) tunneling technology to provide an overlay network via which encapsulated packets may be passed through network substrate 210 using tunnels. The IP tunneling technology may provide a mapping and encapsulating system for creating an overlay network on a network (e.g., a local network in data center 200 of FIG. 2) and may provide a separate namespace for the overlay layer (the public IP addresses) and the network substrate 210 layer (the private IP addresses). Packets in the overlay layer may be checked against a mapping directory (e.g., provided by mapping service 230) to determine what their tunnel substrate target (private IP address) should be. The IP tunneling technology provides a virtual network topology; the interfaces (e.g., service APIs) that are presented to customers are attached to the overlay network so that when a customer provides an IP address to which the customer wants to send packets, the IP address is run in virtual space by communicating with a mapping service (e.g., mapping service 230) that knows where the IP overlay addresses are.

In at least some embodiments, the IP tunneling technology may map IP overlay addresses (public IP addresses) to substrate IP addresses (private IP addresses), encapsulate the packets in a tunnel between the two namespaces, and deliver the packet to the correct endpoint via the tunnel, where the encapsulation is stripped from the packet. In FIG. 2, an example overlay network tunnel 234A from a virtual machine (VM) 224A on host 220A to a device on the intermediate network 250 and an example overlay network tunnel 234B between a VM 224B on host 220B and a VM 224C on host 220C are shown. In some embodiments, a packet may be encapsulated in an overlay network packet format before sending, and the overlay network packet may be stripped after receiving. In other embodiments, instead of encapsulating packets in overlay network packets, an overlay network address (public IP address) may be embedded in a substrate address (private IP address) of a packet before sending, and stripped from the packet address upon receiving. As an example, the overlay network may be implemented using 32-bit IPv4 (Internet Protocol version 4) addresses as the public IP addresses, and the IPv4 addresses may be embedded as part of 128-bit IPv6 (Internet Protocol version 6) addresses used on the substrate network as the private IP addresses.

Referring to FIG. 2, at least some networks in which embodiments may be implemented may include hardware virtualization technology that enables multiple operating systems to run concurrently on a host computer (e.g., hosts 220A and 220B of FIG. 2), i.e. as virtual machines (VMs) 224 on the hosts 220. The VMs 224 may, for example, be rented or leased to customers of a network provider. A hypervisor, or virtual machine monitor (VMM) 222, on a host 220 presents the VMs 224 on the host with a virtual platform and monitors the execution of the VMs 224. Each VM 224 may be provided with one or more private IP addresses; the VMM 222 on a host 220 may be aware of the private IP addresses of the VMs 224 on the host. A mapping service 230 may be aware of all network IP prefixes and the IP addresses of routers or other devices serving IP addresses on the local network. This includes the IP addresses of the VMMs 222 serving multiple VMs 224. The mapping service 230 may be centralized, for example on a server system, or alternatively may be distributed among two or more server systems or other devices on the network. A network may, for example, use the mapping service technology and IP tunneling technology to, for example, route data packets between VMs 224 on different hosts 220 within the data center 200 network; note that an interior gateway protocol (IGP) may be used to exchange routing information within such a local network.

In addition, a network such as the service provider data center 200 network (which is sometimes referred to as an autonomous system (AS)) may use the mapping service technology, IP tunneling technology, and routing service technology to route packets from the VMs 224 to Internet destinations, and from Internet sources to the VMs 224. Note that an external gateway protocol (EGP) or border gateway protocol (BGP) is typically used for Internet routing between sources and destinations on the Internet. FIG. 2 shows an example service provider data center 200 implementing a network that provides resource virtualization technology and that provides full Internet access via edge router(s) 214 that connect to Internet transit providers, according to at least some embodiments. The service provider data center 200 may, for example, provide customers the ability to implement virtual computing systems (VMs 224) via a hardware virtualization service and the ability to implement virtualized data stores 216 on storage resources 218 via a storage virtualization service.

The data center 200 network may implement IP tunneling technology, mapping service technology, and a routing service technology to route traffic to and from virtualized resources, for example to route packets from the VMs 224 on hosts 220 in data center 200 to Internet destinations, and from Internet sources to the VMs 224. Internet sources and destinations may, for example, include computing systems 270 connected to the intermediate network 240 and computing systems 252 connected to local networks 250 that connect to the intermediate network 240 (e.g., via edge router(s) 214 that connect the network 250 to Internet transit providers). The service provider data center 200 network may also route packets between resources in data center 200, for example from a VM 224 on a host 220 in data center 200 to other VMs 224 on the same host or on other hosts 220 in data center 200.

A service provider that provides data center 200 may also provide additional data center(s) 260 that include hardware virtualization technology similar to data center 200 and that may also be connected to intermediate network 240. Packets may be forwarded from data center 200 to other data centers 260, for example from a VM 224 on a host 220 in data center 200 to another VM on another host in another, similar data center 260, and vice versa.

While the above describes hardware virtualization technology that enables multiple operating systems to run concurrently on host computers as virtual machines (VMs) on the hosts, where the VMs may be rented or leased to customers of the network provider, the hardware virtualization technology may also be used to provide other computing resources, for example storage resources 218, as virtualized resources to customers of a network provider in a similar manner.

Figure 3:
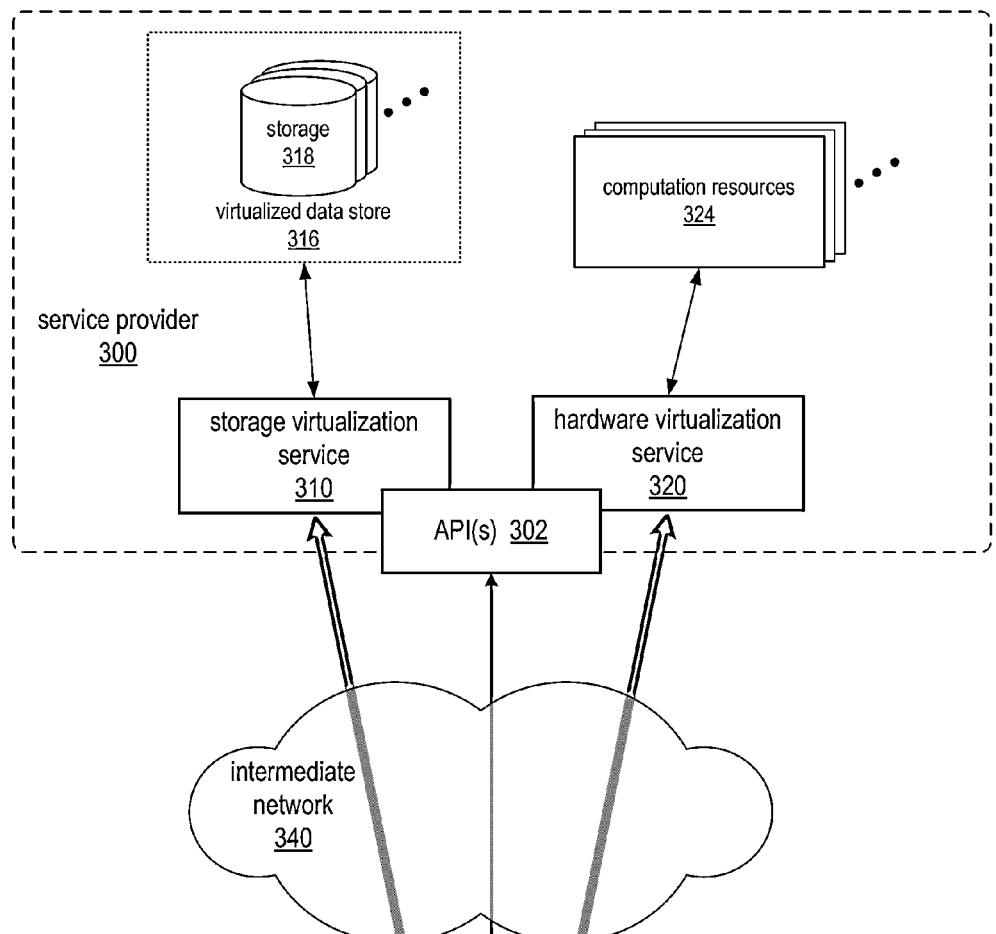
FIG. 3 is a block diagram of an example service provider that provides a storage virtualization service and a hardware virtualization service to customers, according to at least some embodiments.
Figure 3:
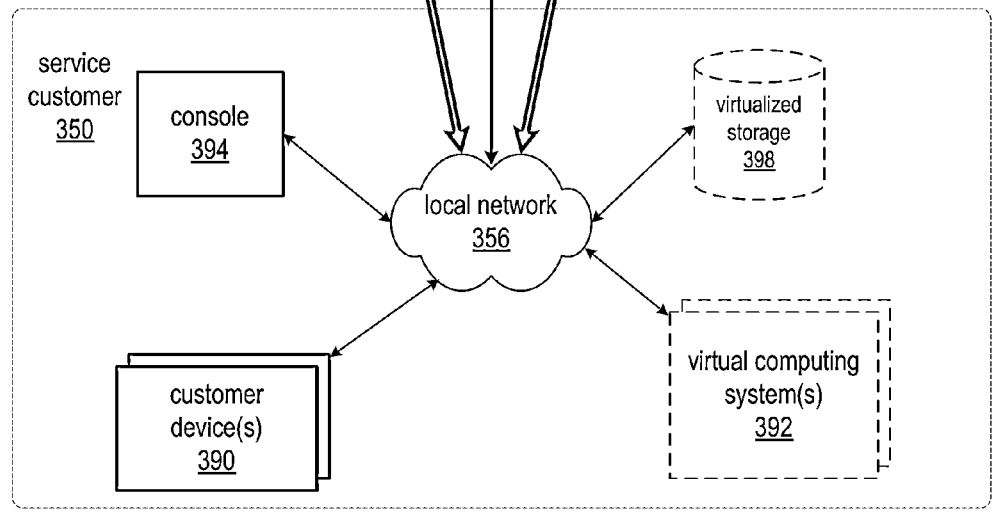

FIG. 3 is a block diagram of an example service provider that provides a storage virtualization service and a hardware virtualization service to customers, according to at least some embodiments. Hardware virtualization service 320 provides multiple computation resources 324 (e.g., VMs) to customers. The computation resources 324 may, for example, be rented or leased to customers of the service provider 300 (e.g., to service customer 350). Each computation resource 324 may be provided with one or more private IP addresses. A local network of service provider 300 may be configured to route packets from the private IP addresses of the computation resources 324 to public Internet destinations, and from public Internet sources to the computation resources 324.

Service provider 300 may provide a service customer 350, for example coupled to intermediate network 340 via local network 356, the ability to implement virtual computing systems 392 via hardware virtualization service 320 coupled to intermediate network 340 and to the local network of service provider 300. In some embodiments, hardware virtualization service 320 may provide one or more APIs 302, for example a web services interface, via which a service customer 350 may access functionality provided by the hardware virtualization service 320, for example via a console 394. In at least some embodiments, at the service provider 300, each virtual computing system 392 at customer 350 may correspond to a computation resource 324 that is leased, rented, or otherwise provided to service customer 350.

From an instance of a virtual computing system 392 and/or another customer device 390 or console 394, the customer may access the functionality of storage virtualization service 310, for example via one or more APIs 302, to access data from and store data to a virtual data store 316 provided by the service provider 300. In some embodiments, a virtualized data store gateway (not shown) may be provided at the service customer 350 that may locally cache at least some data, for example frequently accessed or critical data, and that may communicate with virtualized data store service 310 via one or more communications channels to upload new or modified data from a local cache so that the primary store of data (virtualized data store 316) is maintained. In at least some embodiments, a user, via a virtual computing system 392 and/or on another customer device 390, may mount and access virtual data store 316 volumes, which appear to the user as local virtualized storage 398.

Figure 4:
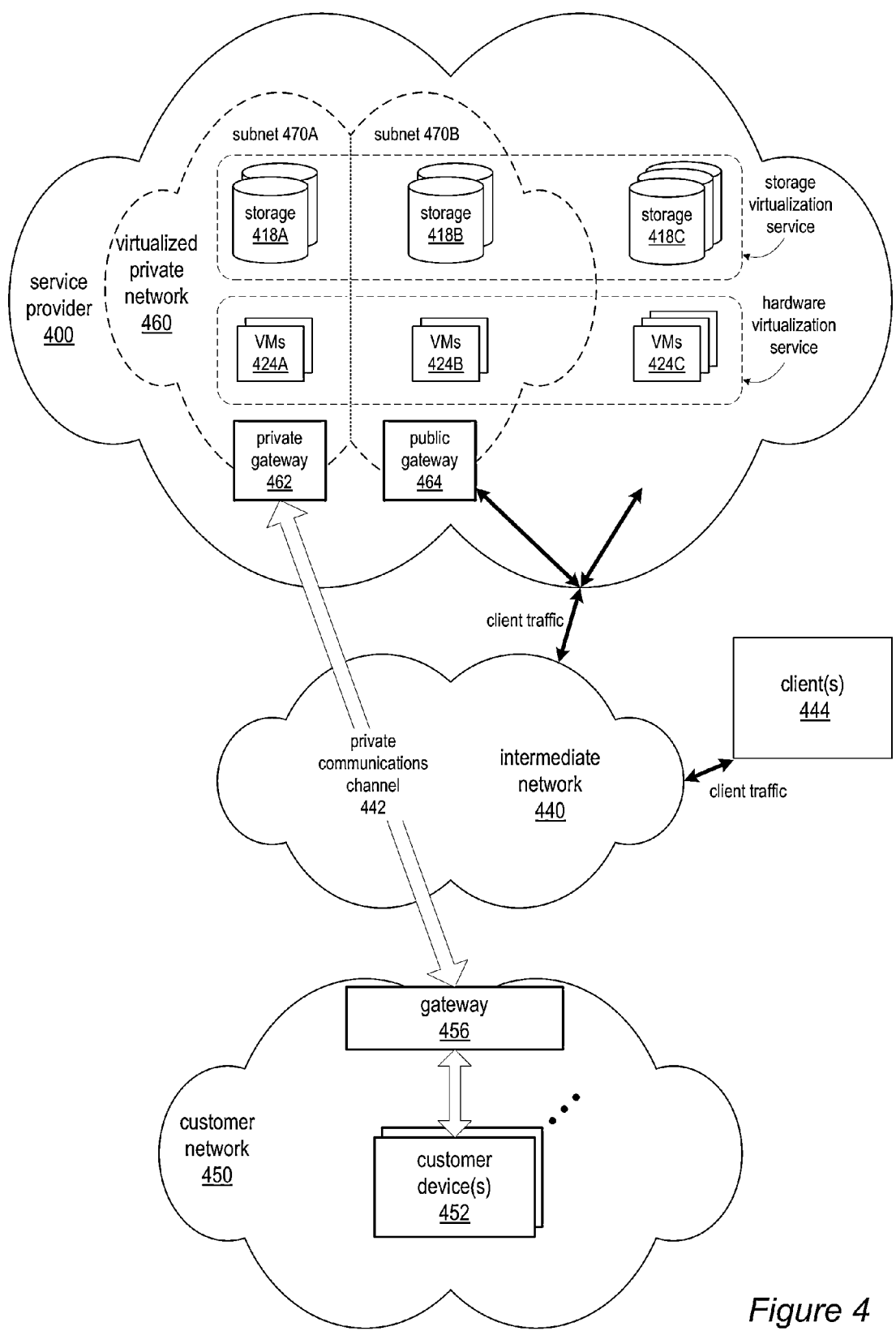
FIG. 4 illustrates an example service provider that provides private networks on the service provider network to at least some customers, according to at least some embodiments.

FIG. 4 illustrates an example service provider that provides private networks on the service provider network to at least some customers, according to at least some embodiments. A customer's virtualized private network 460 on a service provider 400 network, for example, enables a customer to connect their existing infrastructure (e.g., devices 452) on customer network 450 to a set of logically isolated service provider resource instances (e.g., VMs 424A and 424B and storage 418A and 418B), and to extend management capabilities such as security services, firewalls, and intrusion detection systems to include their service provider resource instances.

A customer's virtualized private network 460 may be connected to a customer network 450 via a private communications channel 442. A private communications channel 442 may, for example, be a tunnel implemented according to a network tunneling technology or some other peering connection over an intermediate network 440. The intermediate network may, for example, be a shared network or a public network such as the Internet. Alternatively, a private communications channel 442 may be implemented over a direct, dedicated connection between virtualized private network 460 and customer network 450.

A public network may be broadly defined as a network that provides open access to and interconnectivity between a plurality of entities. The Internet, or World Wide Web (WWW) is an example of a public network. A shared network may be broadly defined as a network to which access is limited to two or more entities, in contrast to a public network to which access is not generally limited. A shared network may, for example, include one or more local area networks (LANs) and/or data center networks, or two or more LANs or data center networks that are interconnected to form a wide area network (WAN). Examples of shared networks may include, but are not limited to, corporate networks and other enterprise networks. A shared network may be anywhere in scope from a network that covers a local area to a global network. Note that a shared network may share at least some network infrastructure with a public network, and that a shared network may be coupled to one or more other networks, which may include a public network, with controlled access between the other network(s) and the shared network. A shared network may also be viewed as a private network, in contrast to a public network such as the Internet. In embodiments, either a shared network or a public network may serve as an intermediate network between a provider network and a customer network.

To establish a virtualized private network 460 for a customer on service provider 400 network, one or more resource instances (e.g., VMs 424A and 424B and storage 418A and 418B) may be allocated to the virtualized private network 460. Note that other resource instances (e.g., storage 418C and VMs 424C) may remain available on the service provider 400 network for other customer usage. A range of public IP addresses may also be allocated to the virtualized private network 460. In addition, one or more networking devices (routers, switches, etc.) of the service provider 400 network may be allocated to the virtualized private network 460. A private communications channel 442 may be established between a private gateway 462 at virtualized private network 460 and a gateway 456 at customer network 450.

In at least some embodiments, in addition to, or instead of, a private gateway 462, virtualized private network 460 may include a public gateway 464 that enables resources within virtualized private network 460 to communicate directly with entities (e.g., client 444) via intermediate network 440, and vice versa, instead of or in addition to via private communications channel 442.

Virtualized private network 460 may be, but is not necessarily, subdivided into two or more subnets 470. For example, in implementations that include both a private gateway 462 and a public gateway 464, the private network may be subdivided into a subnet 470A that includes resources (VMs 424A and storage 418A, in this example) reachable through private gateway 462, and a subnet 470B that includes resources (VMs 424B and storage 418B, in this example) reachable through public gateway 464.

The customer may assign particular customer public IP addresses to particular resource instances in virtualized private network 460. A client 444 on intermediate network 440 may then send traffic to a public IP address published by the customer; the traffic is routed, by the service provider 400, to the associated resource instance. Return traffic from the resource instance is routed, by the service provider 400, back to the client 444 over intermediate network 440. Note that routing traffic between a resource instance and a client 444 may require network address translation to translate between the public IP address and the private IP address of the resource instance.

At least some embodiments may allow a customer to remap public IP addresses in a customer's virtualized private network 460 as illustrated in FIG. 4 to devices on the customer's external network 450. When a packet is received from a client (e.g., client 444), the network 400 may determine that the destination IP address indicated by the packet has been remapped to an endpoint on external network 450 and handle routing of the packet to the respective endpoint, either via private communications channel 442 or via the intermediate network 440. Response traffic may be routed from the endpoint to the client through the provider network 400, or alternatively may be directly routed to the client by the customer network 450. From the perspective of the client, it appears as if the client is communicating with the public IP address of the customer on the provider network 400. However, the client has actually communicated with the endpoint on customer network 450.

While FIG. 4 shows client 444 as a client on intermediate network 440 and external to service provider 400 network, a client may be an entity on service provider 400 network. For example, one of the resource instances provided by the service provider 400 may be a client that sends traffic to a public IP address published by the customer.

Scalable Private Services

In service provider network environments such as those illustrated in FIGS. 1 through 4, the customers' virtualized resources provided through the virtualization services may generally be implemented on multi-tenant devices. For example, in a hardware virtualization service, a single physical computing machine may be shared among multiple customers by providing each customer with one or more virtual machines hosted by the single physical computing machine. As another example, in a storage virtualization service, each customer's virtualized data store may be distributed across multiple data storage devices, with a given storage device storing portions of data for two or more customers. However, at least some customers of a service provider may desire or require some degree of isolation of the customers' data and/or processes on a service provider network. That is, a customer may want to take advantage of cost or other benefits that may be provided via one or more virtualization services provided by a service provider, but for one or more reasons (e.g., regulatory, security, and performance reasons), may desire or require that their virtualized resources be separated from the virtualized resources of other customers.

Figure 5A:
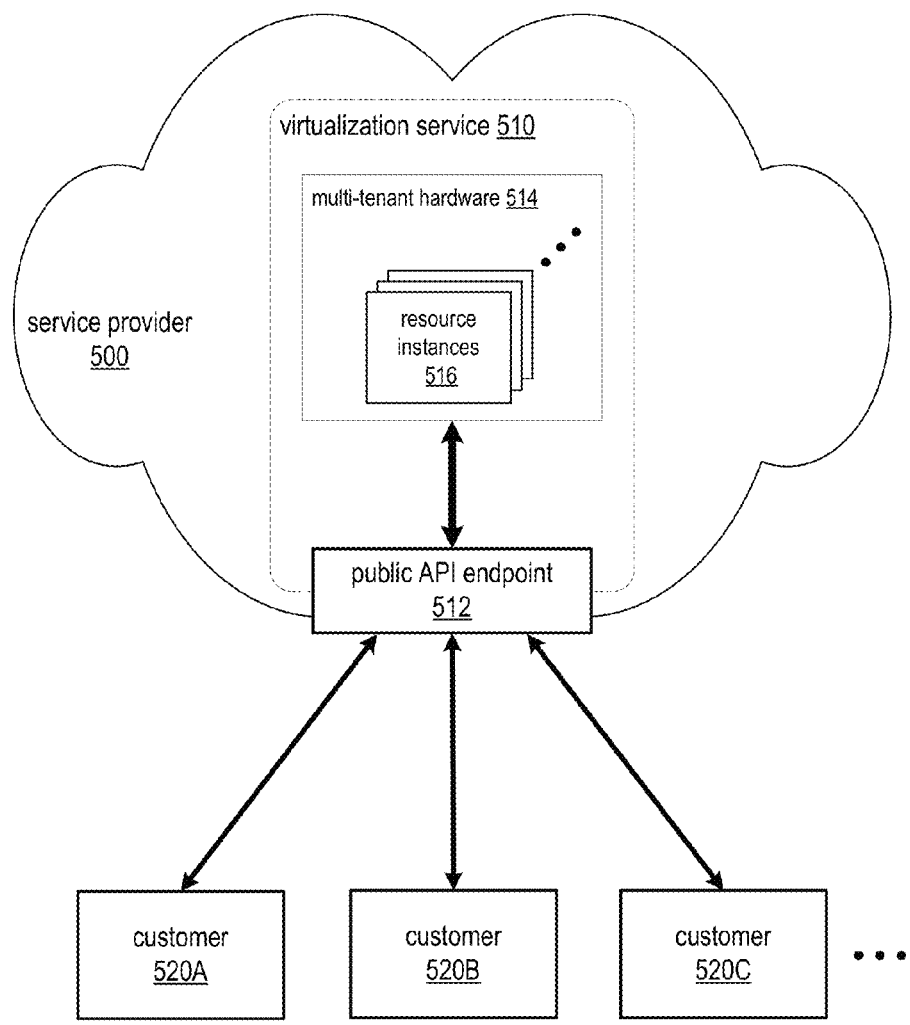
FIG. 5A illustrates multiple customers sharing a multi-tenant implementation of a virtualization service, according to at least some embodiments.

To achieve a degree of logical isolation for customers' virtualized resources, a service provider may provide virtualized private networks as illustrated in FIG. 4 to enable a customer to connect existing infrastructure on the customer's network to a set of logically isolated service provider resource instances, and to extend management capabilities such as security services, firewalls, and intrusion detection systems to include their service provider resource instances. However, at least some of the underlying physical devices in a virtualized private network may still be shared with other customers of the service provider. For example, referring to FIG. 4, VMs 424A and 424B may be implemented together with the VMs 424C of other customers on multi-tenant host systems. As another example, storage 418A and storage 418B may be stored together with the storage 418C of other customers on shared (multi-tenant) physical storage devices. In addition, the customer shares the virtualization services with other customers via public API endpoints to the services, as shown in FIG. 5A. In FIG. 5A, customers 520A, 520B, and 520C share public API endpoint 512 access to a multi-tenant virtualization service 510 provided by service provider 500. The virtualization service 510 implements the customers' resource instances 516 on multi-tenant hardware 514, even if a customer (e.g., customer 520A) has established a virtual private network on the service provider 500 network, as illustrated in FIG. 4.

Figure 5B:
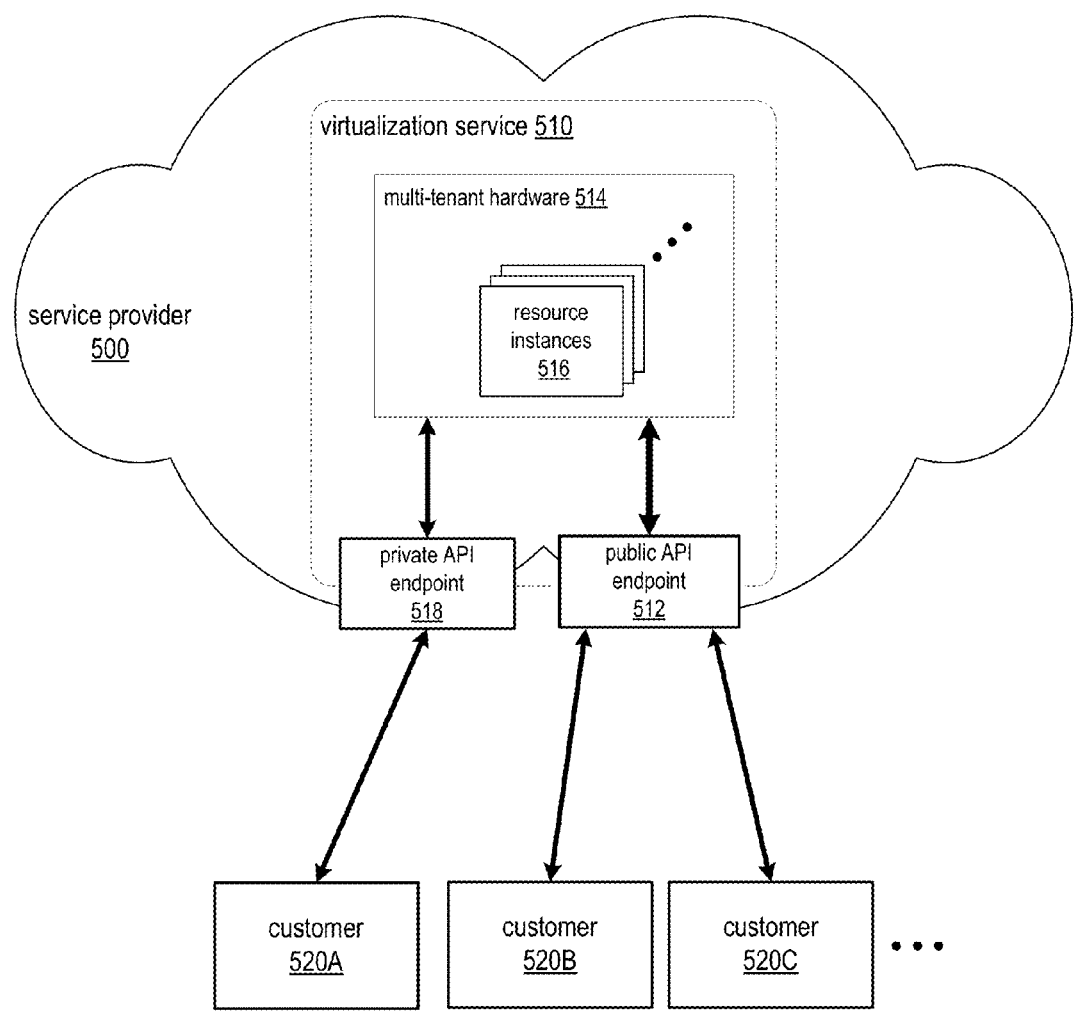
FIG. 5B illustrates a customer establishing a private API endpoint to a virtualization service to provide a degree of logical isolation, according to at least some embodiments.

To achieve a further degree of logical isolation, a service provider may provide customers with the ability to virtualize one or more of the virtualization services (e.g., a storage virtualization service, or a hardware virtualization service) provided by the service provider. For example, a service provider may allow a customer to 'mount' a private API endpoint for a virtualization service in the customer's virtualized private network. FIG. 5B illustrates that customer 520A has established a private API endpoint 518 to virtualization service 510. This allows the customer 520A to establish a private access point to a virtualization service 510 such as a storage virtualization service. The customer 520A, and in some cases the customer's clients, may then access the customer's resource instances 516 provided via the virtualization service 510 through the private API endpoint 518 instead of through the virtualization service's public API endpoint 512. However, while allowing the customer 520A to establish a private API endpoint 518 to virtualization service 510 provides logical isolation of the customer's virtualized resources, customer 520A's resource instances 516 may still be implemented by the virtualization service 510 on multi-tenant hardware 514 that is shared with other customers 520B and 520C.

At least some customers of a service provider may desire or require physical resource isolation. That is, a customer may want to take advantage of cost or other benefits that may be provided via one or more virtualization services provided by a service provider, but for one or more reasons (e.g., regulatory, security, and/or performance reasons), may not want to share the underlying physical resources with other customers.

Figure 6:
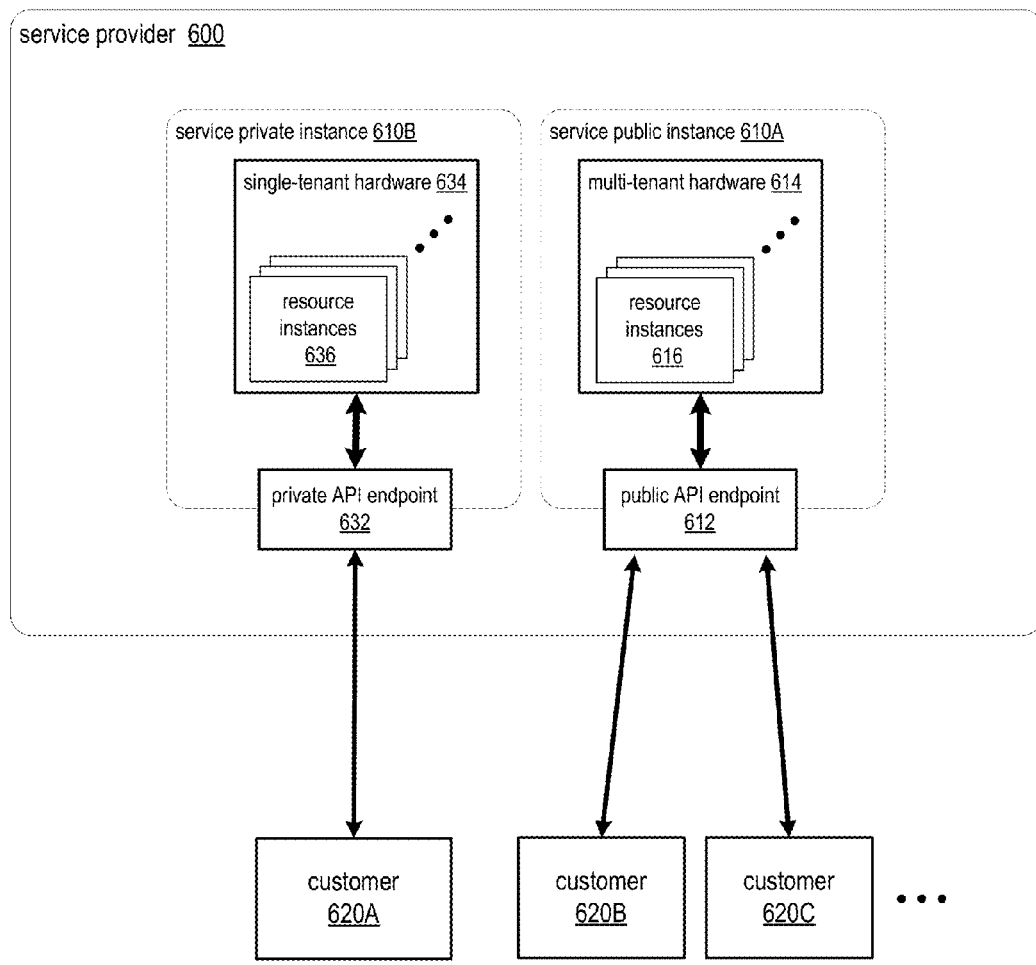
FIG. 6 illustrates a service private instance that provides physical isolation for a customer's resources provided through a virtualization service, according to at least some embodiments.

Embodiments of scalable private services for service provider networks may provide physical isolation for a customer's resources provided through a virtualization service, as illustrated in FIG. 6. A service provider 600 may provide a service public instance 610A to customers (e.g., customers 610B and 610C). A customer, e.g. customer 610B, shares the service public instance 610A with other customers, e.g. customer 610C, via a public API endpoint 612 to the service. The service public instance 610A implements at least some of the customers' resource instances 616 on multi-tenant hardware 614.

In at least some embodiments, to provide physical isolation for a customer's resources, the customer 620A may request a private instance of a virtualization service, for example when establishing a private API endpoint 632 to the virtualization service through the customer's virtualized private network. For example, an IT administrator at the customer 620A may generate the request from a console 394 at the service customer network 350, as illustrated in FIG. 3. As another example, in at least some embodiments, a request for a private instance of a virtualization service may be automatically generated by a process of customer 620A. As an example, a web services process executing at customer 620A (or on a virtualized private network of customer 620A) may generate a request for a service private instance.

Referring again to FIG. 6, in response to the request for a private instance of the virtualization service, a service private instance 610B may be established for the customer 620A by the service provider 600. In the service private instance 610B, some or all of customer 620A's resource instances 636 for providing the virtualization service to the customer 620A are instantiated on single-tenant hardware 634 that is not shared with any other customers. In addition, a private API endpoint 632 may be established to the service private instance 610B. While not shown in FIG. 6, servers, storage nodes, routers, switches, NATs, and other hardware and network infrastructure, as well as new instances of software processes and/or data that may be necessary to implement a separate instance of the virtualization service, may also be included in service private instance 610B. Using a storage virtualization service as an example, establishing service private instance 610B may involve creating a new installation of the storage virtualization service, including dedicated computing devices, web servers, storage nodes, network infrastructure, and so on that are necessary to implement an instance of the storage service.

Note that service private instance 610B may include hardware, software, and/or data components that collectively instantiate a functioning copy of the service. However, two instances of a virtualization service (e.g., service public instance 610A and service private instance 610B) may be configured differently and do not necessarily include the same types or quantities of hardware, software, and/or data components. For example, in at least some embodiments, an initial implementation of service private instance 610B may provide the virtualization service API interface via private API endpoint 632, but may be smaller and simpler than service public instance 610A which is intended to support multiple customers via multi-tenant hardware 614. Again using a storage virtualization service as an example, in at least some embodiments, an initial private instance of the storage virtualization service may be implemented that provides the storage virtualization service API interface, but which is smaller, simpler, relatively easier to deploy, and possibly more expensive per unit capacity than a typical public implementation of the storage virtualization service intended to support multiple customers via multi-tenant hardware. For example, the customer's virtualized data volume may initially be supportable via MySQL database technology or other smaller-scale data storage technology, while the public implementation uses a different data storage technology that supports a much larger data store. As another example, the customer's single-tenant virtualized data store may initially be implemented on one or a few single-tenant data storage devices with one or a few web servers as a front-end to the customer's single-tenant virtualized data store, while the public implementation may employ hundreds or thousands of multi-tenant data storage devices and many web servers to implement the multi-tenant virtualized data store. As yet another example, the public implementation of the service may implement routing technology, including routing hardware and/or software, that supports routing traffic from multiple customers accessing their respective data in the multi-tenant virtualized data store. The service private instance may at least initially implement different routing technology, or similar routing technology differently configured, since traffic related to only the single customer is routed on the service private instance.

In at least some embodiments, in response to automatically detecting or anticipating an increase in usage of a customer's private instance such as service public instance 610A, or in response to a request for an upgrade by the customer, the initial or current implementation of the service public instance 610A may be scaled up by reconfiguring the service public instance 610A. Reconfiguring a service private instance such as service public instance 610A may involve modifying, upgrading, replacing, and/or adding components to support the detected or anticipated increase in usage. Again using a storage virtualization service as an example, as the customer's data volume grows, or as traffic to the storage virtualization service increases, one or more components of the data storage technology used in the customer's service private instance may be modified, replaced, or upgraded, and/or additional components may be added, to support larger data volumes and/or higher traffic rates. This scaling up of the customer's private implementation of the service may happen more than once as usage increases over time. Note that the customer's private implementation of the service may either initially employ the data storage technology used in the service public instance, or may be scaled up to employ the data storage technology used in the service public instance. Also note that scaling up of a service private instance may, but does not necessarily, involve adding additional hardware devices to the service private instance.

In at least some embodiments, the scaling up of a service private instance such as service public instance 610A may be performed transparently to the customer; that is, reconfiguration of the service private instance to achieve the scaling up may be automatically initiated in response to the service provider detecting a need to scale up the service private instance, and may be manually and/or automatically performed while not significantly affecting access to or performance of the service private instance from the customer's perspective.

In at least some embodiments, a service private instance may also be scaled down by reconfiguring the service private instance. For example, service public instance 610A may be scaled down in response to a detected or anticipated decrease in usage, or in response to the customer requesting that the service private instance be scaled down. Note that scaling down a service private instance may, but does not necessarily, involve removing hardware devices from the service private instance. In at least some embodiments, the scaling down of a service private instance such as service public instance 610A may be performed transparently to the customer; that is, the scaling down may be manually and/or automatically performed and may not significantly affect access to and performance of the service private instance from the customer's perspective.

While FIG. 6 shows service private instance 610B as being implemented independently of service public instance 610A, in at least some embodiments, a service private instance may be implemented in which one or more components or resources of the service provider network are shared by a service private instance and the service public instance. A virtualization service architecture may include two or more logical layers. For example, a storage virtualization service may include a front-end layer that includes web servers, and a back-end layer that includes storage nodes. The service public instance may provide resources (e.g., web servers and storage nodes) to customers on multi-tenant hardware at each layer. To implement a service private instance, the resources at one or more layers of the service private instance may be implemented on single-tenant hardware, while the resources at one or more other layers of the service private instance may be implemented on multi-tenant hardware along with resources of the service public instance.

FIGS. 7A through 7D illustrate implementing a service private instance for a virtualization service architecture that includes multiple layers. In FIGS. 7A through 7D, a storage virtualization service is used as an example, but note that other types of virtualization services may be implemented according to a similar layered architecture, and a service private instance may be implemented for those virtualization services in a similar manner as illustrated in FIGS. 7A through 7D.

Figure 7A:
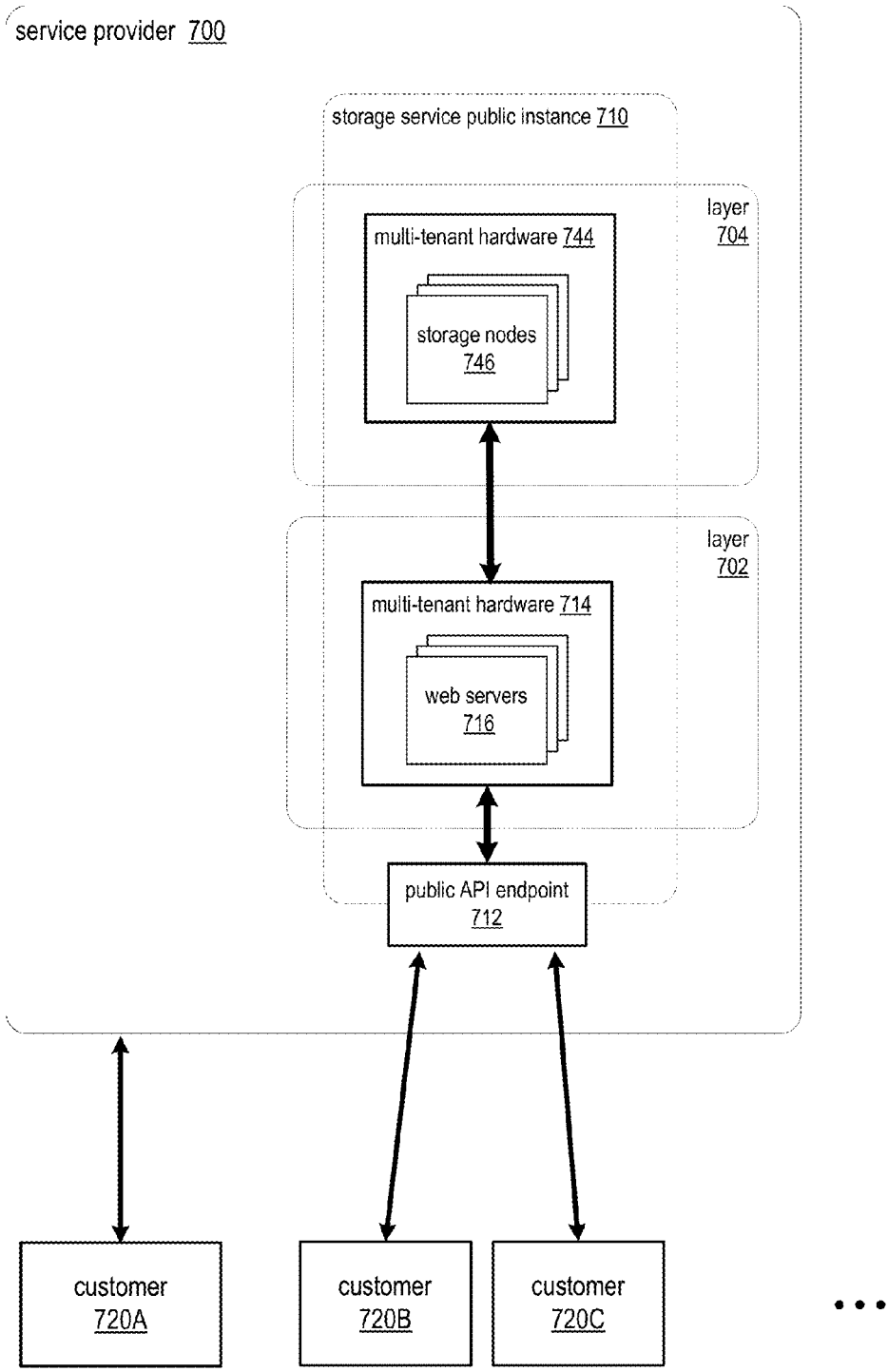
FIG. 7A illustrates a storage service public instance that includes multiple logical layers, according to at least some embodiments.

As shown in FIG. 7A, a storage virtualization service provided by a service provider 700 is implemented as a storage service public instance 710. There are two layers to the storage virtualization service: layer 702, at which web servers 716 are implemented, and layer 704, at which storage nodes 746 are implemented. In storage service public instance 710, web servers 716 are implemented on multi-tenant hardware 714, and storage nodes 746 are implemented on multi-tenant hardware 744. For example, to implement web servers 716 on multi-tenant hardware 714, one or more physical, multi-tenant computing devices may be shared among multiple customers by providing each customer with one or more virtualized web servers 716 hosted on the multi-tenant computing devices. A single computing device may host virtualized web servers 716 for two or more customers. To implement storage nodes 746 on multi-tenant hardware 744, each customer's virtualized storage may be distributed across multiple data storage devices, with a given storage device storing portions of data for two or more customers. Customers, e.g. customers 720B and 720C, generally access storage service public instance 710 via a public API endpoint 712.

Figure 7B:
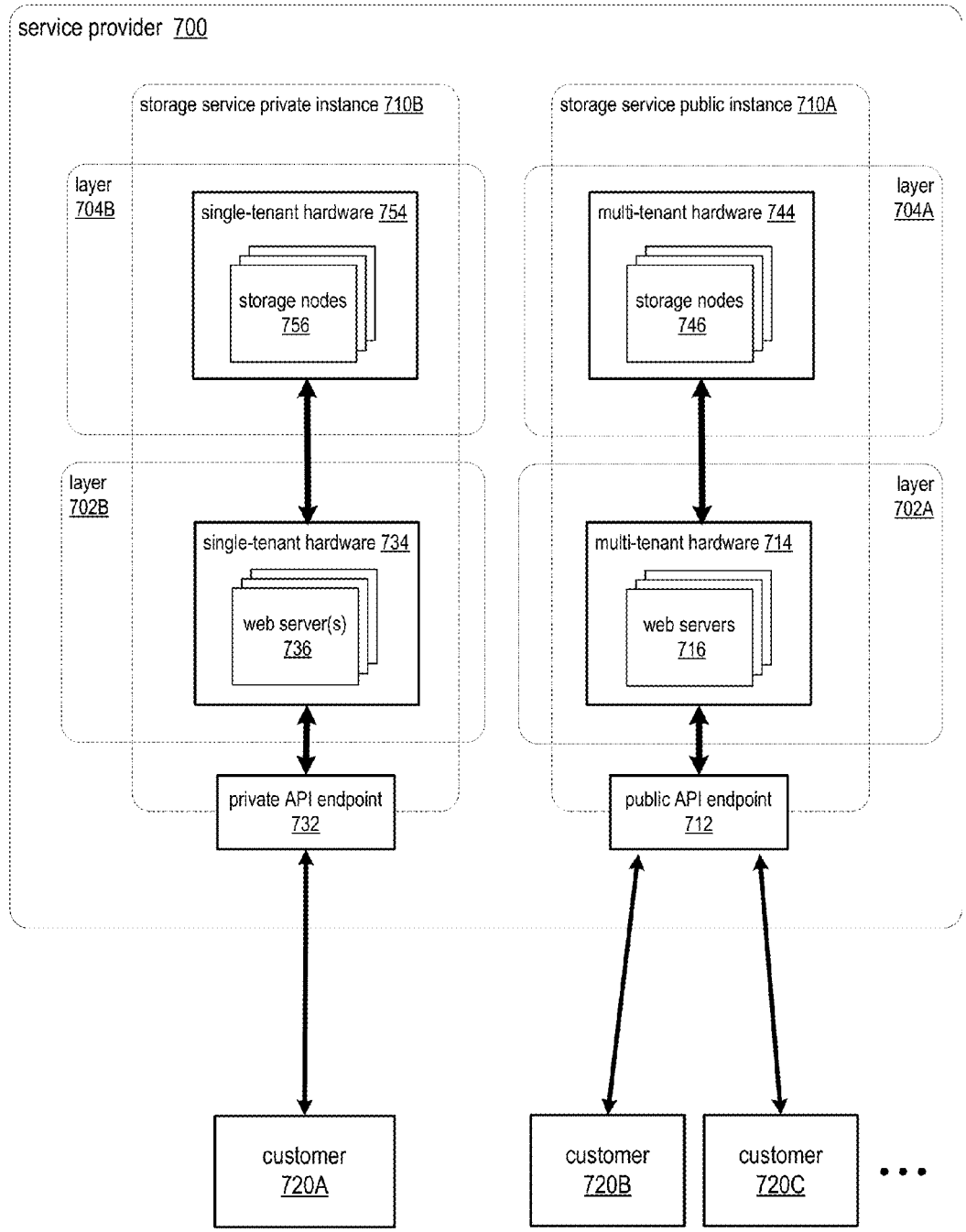
FIG. 7B illustrates isolation of a customer's resources by providing single-tenant hardware for the customer at all layers of a storage virtualization service, according to at least some embodiments.
Figure 7C:
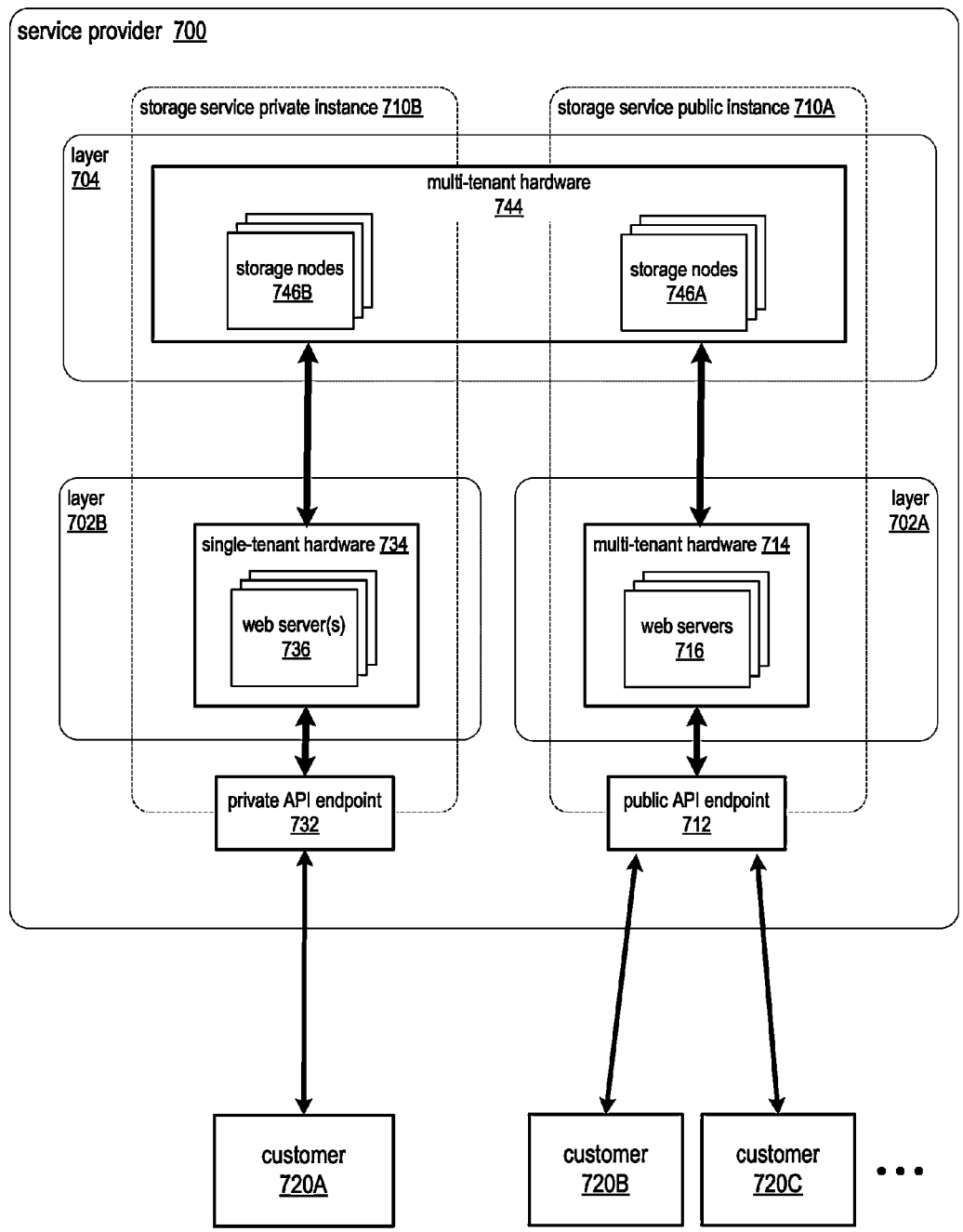
FIGS. 7C and 7D illustrate isolation of a customer's s resources at one or more layers of a storage virtualization service rather than at all layers of the storage virtualization service as shown in FIG. 7B.
Figure 7D:
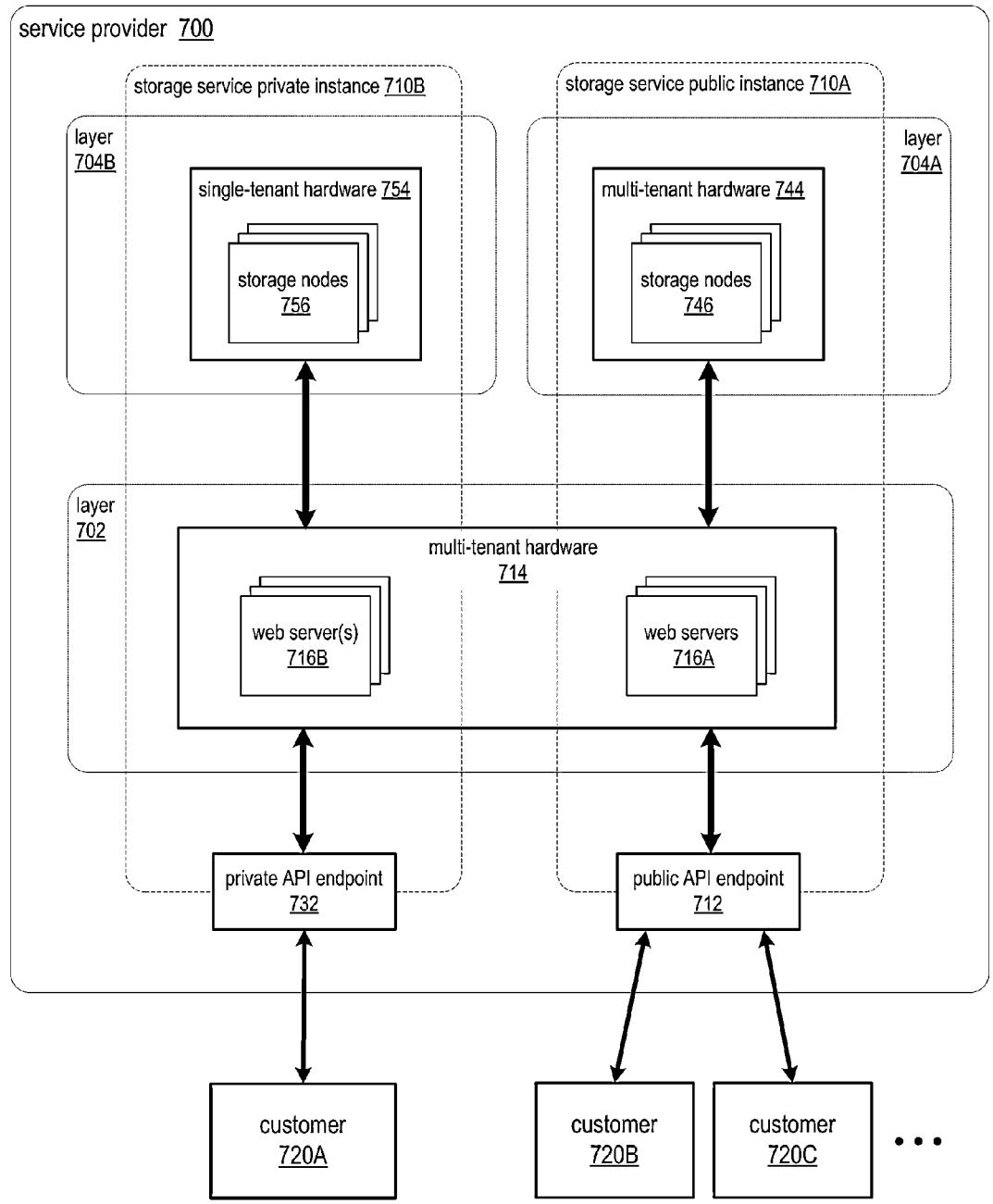

FIGS. 7B through 7D illustrate examples of a service private instance implemented for a virtualization service architecture that includes multiple layers, as shown in FIG. 7A. FIG. 7B illustrates an example in which resources at all layers of the service private instance are implemented on single-tenant hardware. FIGS. 7C and 7D illustrate examples in which resources at one layer of the service private instance are implemented on single-tenant hardware, while resources at another layer of the service private instance are implemented on multi-tenant hardware along with resources for other customers of the service public instance.

Referring to FIG. 7B through 7D, a customer 720A may desire or require more isolation for the customer's storage resources than is provided in the storage service public instance 710, for example for security reasons. While not shown in FIGS. 7B through 7D, the service provider 700 may provide a virtualized private network for customer 720A, as illustrated in FIG. 4. The service provider 700 may allow the customer to 'mount' a private API endpoint for the storage virtualization service in the customer's virtualized private network. At least some communications and data exchange between the customer's virtualized private network and external entities (e.g., the customer's network 450 as shown in FIG. 4) may be over a private communications channel 442 as shown in FIG. 4. The customer 720A may request a private API endpoint to the storage virtualization service, and may also specifically request that resources provided to the customer 720A by the storage virtualization service are physically private resources (i.e., implemented on single-tenant hardware) rather than logically private resources implemented on multi-tenant hardware. In response to the customer's request, a storage service private instance 710B, separate from storage service public instance 710A, may be automatically and/or manually configured, implemented, and provided to the customer 720A. At least some of the devices used to implement the storage service private instance 710B are single-tenant devices on which only customer 720A's processes and/or data are instantiated.

As shown in FIG. 7B, isolation of customer 720A's storage resources may be accomplished by providing single-tenant hardware for the customer 720A at all layers of the storage virtualization service so that little or nothing is shared between the customer's storage service private instance 710B and storage service public instance 710A. As shown in FIG. 7B, single-tenant hardware 734 is provided to the customer 720A at layer 702, on which the customer's web server(s) 736 are instantiated. Similarly, single-tenant hardware 754 is provided to the customer 720A at layer 704, on which the customer's storage nodes 756 are instantiated. A private API endpoint 732 to storage service private instance 710B is also provided to the customer 720A. While not shown, separate instances of at least some processes of the storage virtualization service may be instantiated for the storage service private instance 710B. As shown in FIG. 7B by layer 702 being split into layers 702A and 702B and layer 704 being split into layers 704A, and 704B, the layers of the storage service private instance 710B are effectively isolated from the layers of the storage service public instance 710A However, for at least some cases, adequate or acceptable security and isolation may be achieved by isolating resources at one or more layers of the storage virtualization service, as shown in FIGS. 7C and 7D, rather than at all layers of the storage virtualization service as shown in FIG. 7B.

As shown in FIG. 7C, web server(s) 736 at layer 702 of the storage service private instance 710B are implemented on single-tenant hardware 734, while storage nodes 746B at layer 704 of the storage service private instance 710B are implemented on multi-tenant hardware 744 along with storage nodes 746A for customers of the storage service public instance 710A. Thus, layer 702 is not shared by the storage service private instance 710B and the storage service public instance 710A, as shown by layer 702 being implemented separately for the two instances as layer 702A and layer 702B.

In at least some implementations of a storage service private instance 710B as shown in FIG. 7C, to provide additional security for the customer's data, data being written to the customer's virtualized storage in layer 704 may be encrypted or otherwise secured before being passed to the public portion of the service provider 700 network. In at least some implementations, this securing of the customer's data may be performed at the web server layer (layer 702B) of the storage service private instance 710B.

As shown in FIG. 7D, storage nodes 756 at layer 704 of the storage service private instance 710B are implemented on single-tenant hardware 754, while web servers 716A at layer 702B of the storage service private instance 710B are implemented on multi-tenant hardware 714 along with web servers 716A for customers of the storage service public instance 710A. Thus, layer 704 is not shared by the storage service private instance 710B and the storage service public instance 710A, as shown by layer 704 being implemented separately for the two instances as layer 704A and layer 704B.

In at least some implementations of a storage service private instance 710B as shown in FIG. 7D, to provide additional security for the customer's data, data in the customer's virtualized storage in layer 704B may be encrypted or otherwise secured at the virtualized storage layer (layer 704B). Data packets sent from layer 704B to the web servers 716B on the public portion of the service provider 700 network thus contain encrypted data portions, while necessary routing information is left unencrypted.

In at least some implementations of a storage service private instance 710B as shown in FIG. 7D, a private API endpoint 732 to the service private instance 710B may be established, while a public API endpoint 712 may be provided for the service public instance 710A. Alternatively, a private API endpoint 732 may not be provided and the service private instance 710B may be accessed via public API endpoint 712.

Establishing a Service Private Instance

Figure 8:
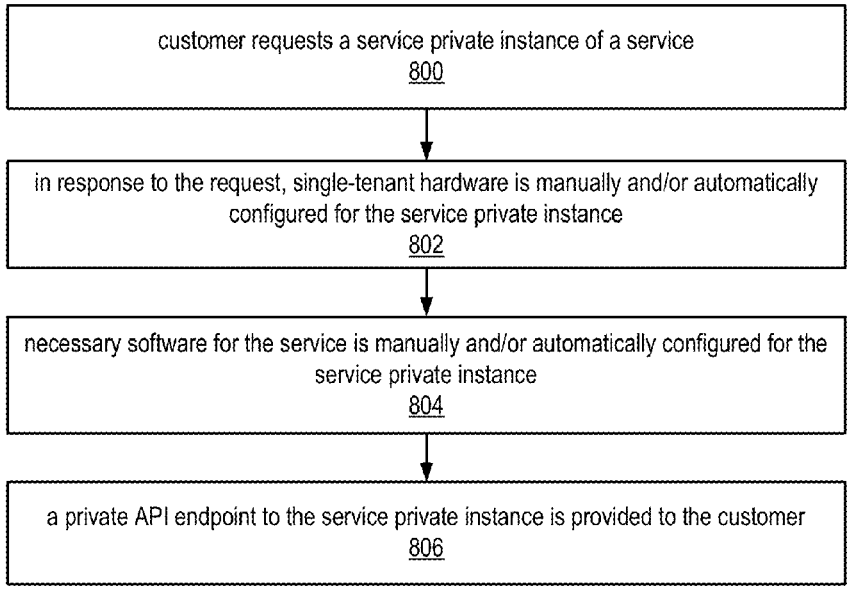
FIG. 8 is a flowchart of a method for establishing a service private instance, according to at least some embodiments.

FIG. 8 is a flowchart of a method for establishing a service private instance, according to at least some embodiments. As indicated at 800, a customer may request a private instance of a virtualization service, for example when establishing a private API endpoint to the virtualization service through the customer's virtualized private network. For example, a user such as an IT administrator may generate the request from a console at the service customer network, as illustrated in FIG. 3. The console may, for example, display a web page or other user interface to an account management system provided by the service provider that allows the user to manage the customer's resources on the service provider network. The user interface may provide one or more user interface elements via which a user may request a private API endpoint to the virtualization service, and also request a service private instance. The user interface may also provide one or more user interface elements via which the user may specify a configuration for the service provider instance, for example by indicating how many of which resources the customer requires as an initial implementation. Alternatively, the user may specify expected initial usage of the service provider instance (e.g., an initial amount of storage space required for virtualized storage), and the required configuration to support the specified initial usage may be derived from the provided information. In at least some embodiments, other methods may be used to request a service private instance and/or to specify a configuration for a service private instance, including but not limited to email and telephone. For example, in at least some embodiments, a request for a private instance of a virtualization service may be automatically generated by a customer process rather than by a user via a user interface on a console. As an example, a web services process executing on the customer network (or on a virtualized private network of the customer) may generate a request for a service private instance.

As indicated at 802, in response to the request for a private instance of the virtualization service, single-tenant hardware to support the service private instance as specified may be manually and/or automatically configured by the service provider. Configuring the service private instance may require installing, configuring, and connecting one or more single-tenant hardware devices to support the service private instance. For example, one or more of server devices, storage devices, routers, switches, cables, power supplies, and possibly other hardware necessary to implement the service private instance may be installed and appropriately configured and connected. Alternatively, in at least some embodiments, at least some of the single-tenant hardware may be pre-installed, and may be manually and/or automatically configured to implement the physical infrastructure of the service private instance. Note that, in at least some embodiments, a service private instance may be initially configured to support all of the functionality of the respective virtualization service, or alternatively may be initially configured to support only a portion of the functionality of the respective virtualization service. In addition, the service private instance is at least in part implemented on single-tenant hardware dedicated to the single customer, and thus at least a portion of the service private instance hardware is not shared among multiple customers as is the service public instance. Thus, the service private instance may be at least initially configured with only a portion of the hardware and/or software components that are necessary to support the service public instance.

The single-tenant hardware for the service private instance may be installed in the same data center(s) in which the service provider network and service public instance are instantiated. Alternatively, at least a portion of the single-tenant hardware may be installed in other locations.

As indicated at 804, necessary software for implementing the service may be manually and/or automatically configured for the service private instance. Configuring the software may, for example, include installing software for implementing server processes, network address translators (NATs), virtual machines, and in general any software and data necessary to support functionality of the service private instance. Note that, in at least some embodiments, a service private instance may be initially configured to support all of the functionality of the respective virtualization service, or alternatively may be initially configured to support only a portion of the functionality of the respective virtualization service. In addition, the service private instance is at least in part implemented on single-tenant hardware dedicated to the single customer, and thus at least a portion of the service private instance hardware and software is not shared among multiple customers as is the service public instance. Thus, the service private instance may be at least initially configured with only a portion of the software and/or data that is used to implement the service public instance.

As indicated at 806, a private API endpoint to the service private instance may be established. In at least some embodiments, the private API endpoint may be established within the customer's virtualized private network on the service provider network. The private API endpoint may be accessible through the customer's virtual private network to access functionality of the virtualization service that is supported by the service private instance. Alternatively, in at least some implementations, the service private instance may be accessed via a public API endpoint to the service.

As previously noted, for at least some cases, adequate or acceptable security and isolation may be achieved by isolating resources at one or more layers of the storage virtualization service, as shown in FIGS. 7C and 7D, rather than at all layers of the storage virtualization service as shown in FIG. 7B. Thus, in these cases, elements 802 and 804 of FIG. 8 may be performed at one or more layers of a virtualization service to establish a service private instance, while one or more other layers of the service private instance are implemented on the shared hardware and software provided in the service public instance. Note that establishing the service private instance in a shared layer of a virtualization service, as illustrated in FIGS. 7C and 7D, may require configuration of hardware and/or software at the shared layer, and may but does not necessarily require the installation of new hardware and/or software at the shared layer.

Scaling a Service Private Instance

After a service private instance is established, for example according to the method illustrated in FIG. 8, the customer may begin to use the service private instance. For example, the service private instance may be a storage service private instance, as illustrated in FIGS. 7A-7D, and the customer may begin to store data to the virtualized storage provided by the storage service private instance. As another example, the service private instance may be a private instance of a hardware virtualization service as illustrated in FIG. 2, and the customer may begin to use virtual machines provided by the hardware virtualization service private instance.

The initial needs of the customer may only require a relatively small number of hardware devices and virtualized resources to implement the customer's service private instance when compared to a full-blown service public instance that supports many customers. In addition, as previously noted, in at least some embodiments, a service private instance may be initially configured to support only a portion of the functionality of the respective virtualization service, or may initially configured using different technology than the service public instance, such as different database technology, to support the customer's needs. However, the customer's needs may grow over time as usage of the service private instance increases. For example, traffic to the customer private instance may increase, and/or the amount of data that the customer stores to virtualized storage may increase. Thus, at least some embodiments may support scaling up of an established service private instance to support detected or anticipated increase in usage.

Figure 9:
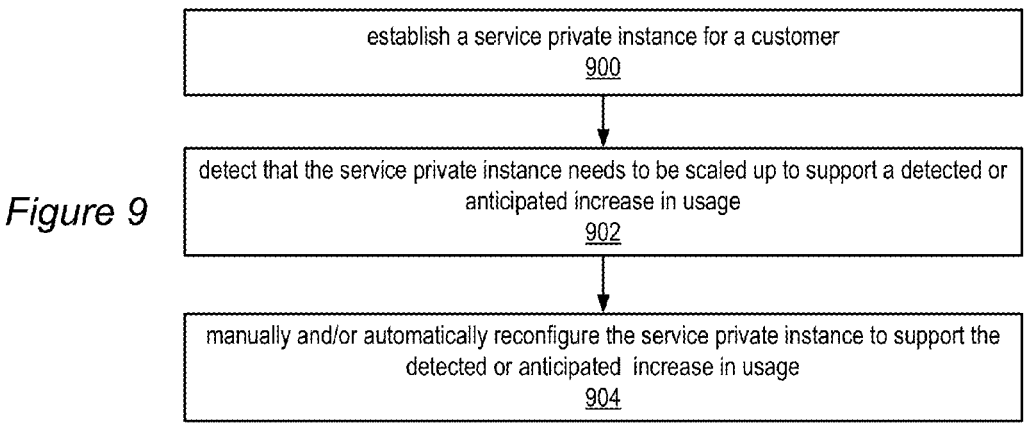
FIG. 9 is a flowchart of a method for scaling up a service private instance, according to at least some embodiments.

FIG. 9 is a flowchart of a method for scaling up a service private instance, according to at least some embodiments. As indicated at 900, a service private instance is established for a customer, for example according to the method illustrated in FIG. 8. As previously noted, the service private instance may be initially implemented as a relatively small configuration when compared to the service public instance. As indicated at 902, a manual or automated process may detect that the service private instance needs to be scaled up to support a detected or anticipated increase in usage of the service private instance. In at least some embodiments, one or more usage metrics may be monitored by a human or by an automated process to detect if and when usage of the service private instance exceeds a threshold or thresholds. For example, if the service is a storage service, one or more storage usage metrics may be monitored by a human or by an automated process to detect if and when storage usage within the storage private service exceeds a storage threshold. Alternatively, a customer may simply request that the service private instance be scaled up, or may request that additional resources be added to the service private instance, for example in anticipation of an increase in usage.

As indicated at 904, in response to detecting that the service private instance needs to be scaled up, the service private instance may be manually and/or automatically reconfigured to support the detected or anticipated increase in demand. Reconfiguring the service private instance may, but does not necessarily, involve manually and/or automatically adding additional software and/or hardware components to the service private instance. For example, one or more of server devices, storage devices, routers, switches, cables, power supplies, and possibly other hardware may be installed and appropriately configured and connected to the service private instance. Alternatively, in at least some embodiments, at least some of the hardware may be pre-installed, and may be manually and/or automatically configured as additions to the physical infrastructure of the service private instance. In addition, additional software for implementing server processes, network address translators (NATs), virtual machines, and in general any software and data necessary to add required functionality to or increase the capacity of existing functionality of the service private instance may be added to the service private instance. Reconfiguring the service private instance may instead, or may also, involve replacing or upgrading one or more software and/or hardware components of the service private instance. For example, in a storage service private instance, the customer's virtualized data volume may initially be supported via MySQL database technology or other smaller-scale data storage technology; reconfiguring the storage service private instance may involve replacing the MySQL database technology with a more robust database technology that can support much larger data storage volumes. Reconfiguring the service private instance may instead, or may also, involve implementing or enabling additional features of the virtualization service in the service private instance that were at least initially disabled or not implemented.

In at least some embodiments, the scaling up of a service private instance by reconfiguring the service private instance may be performed transparently to the customer; that is, the reconfiguration may be automatically initiated in response to the service provider detecting a need to scale up the service private instance, and may be manually and/or automatically performed while not significantly affecting access to or performance of the service private instance from the customer's perspective.

Thus, a customer's service private instance may be initially created as a relatively small instance of the virtualization service, and may have limited functionality, when compared to the full service public instance that supports multiple customers. However, the service private instance may be dynamically scaled up over time, and additional functionality may be dynamically added to the service private instance as necessary or desired to support the changing needs of the customer. In at least some embodiments, the scaling up of a customer's service private instance may be performed by the service provider in response to the service provider detecting a need to support a detected or anticipated increase in usage of in the service private instance, and thus the scaling up may be automatically and transparently performed from the perspective of the customer.

Figure 10:
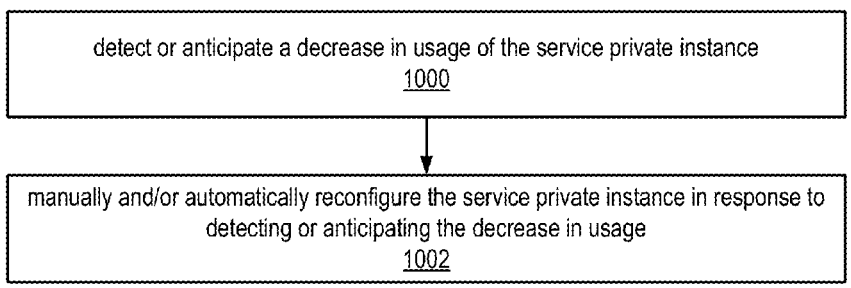
FIG. 10 is a flowchart of a method for scaling down a service private instance, according to at least some embodiments.

The customer's need for or usage of the virtualization service may also decrease over time. Thus, at least some embodiments may support scaling down of an established service private instance. FIG. 10 is a flowchart of a method for scaling down a service private instance, according to at least some embodiments. As indicated at 1000, a manual or automated detection process may detect or anticipate a decrease in usage of the service private instance, and thus may determine that the service private instance can be scaled down. Because of the decrease in usage, one or more software and/or hardware components may no longer be required and thus may be removed from or disabled in the service private instance. In at least some embodiments, to detect or anticipate a decrease in usage, one or more metrics may be monitored by a human or by an automated process to detect if and when resource usage drops (and stays) below a threshold or thresholds. For example, if the service is a storage service, one or more storage usage metrics may be monitored by a human or by an automated process to detect if and when storage usage within the storage private service drops and stays below a storage threshold. Alternatively, a customer may simply request that the service private instance be scaled down, or may request that one or more resources be removed from the service private instance, for example in anticipation of a decrease in usage.

As indicated at 1002, in response to detecting that the service private instance can be scaled down, the service private instance may be manually and/or automatically reconfigured. Reconfiguring the service private instance may, but does not necessarily, involve physically removing one or more software and/or hardware components of the service private instance. For example, one or more server devices, storage devices, routers, switches, cables, power supplies, and possibly other hardware may be uninstalled and disconnected from the service private instance. In addition, software for implementing server processes, network address translators (NATs), virtual machines, and in general any software and data that may be removable from the service private instance to scale the private instance down may be removed from the service private instance. In at least some embodiments, instead of physically removing a given component (e.g., a single-tenant hardware device) from the service private instance when scaling down the service, the component may be disabled while remaining physically within or attached to the service private instance. Reconfiguring the service private instance may instead, or may also, involve replacing or downgrading one or more software and/or hardware components of the service private instance. Reconfiguring the service private instance may instead, or may also, involve disabling one or more features of the virtualization service in the service private instance that were previously enabled.

Note that scaling down a service private instance may involve consolidating functionality and/or data on remaining hardware devices. For example, in a storage private instance, stored data on storage nodes to be removed may be migrated to storage nodes that will remain in the scaled-down service private instance prior to (or after) removing or disabling the storage nodes. As another example, two or more server processes or virtual machines on two or more devices may be consolidated to one device that will remain in the scaled-down service private instance.

In at least some embodiments, the scaling down of a service private instance by reconfiguring the service private instance may be performed transparently to the customer; that is, the reconfiguration may be automatically initiated in response to the service provider detecting or anticipating a decrease in usage of the service private instance, and may be manually and/or automatically performed while not significantly affecting access to or performance of the service private instance from the customer's perspective.

Illustrative System

Figure 11:
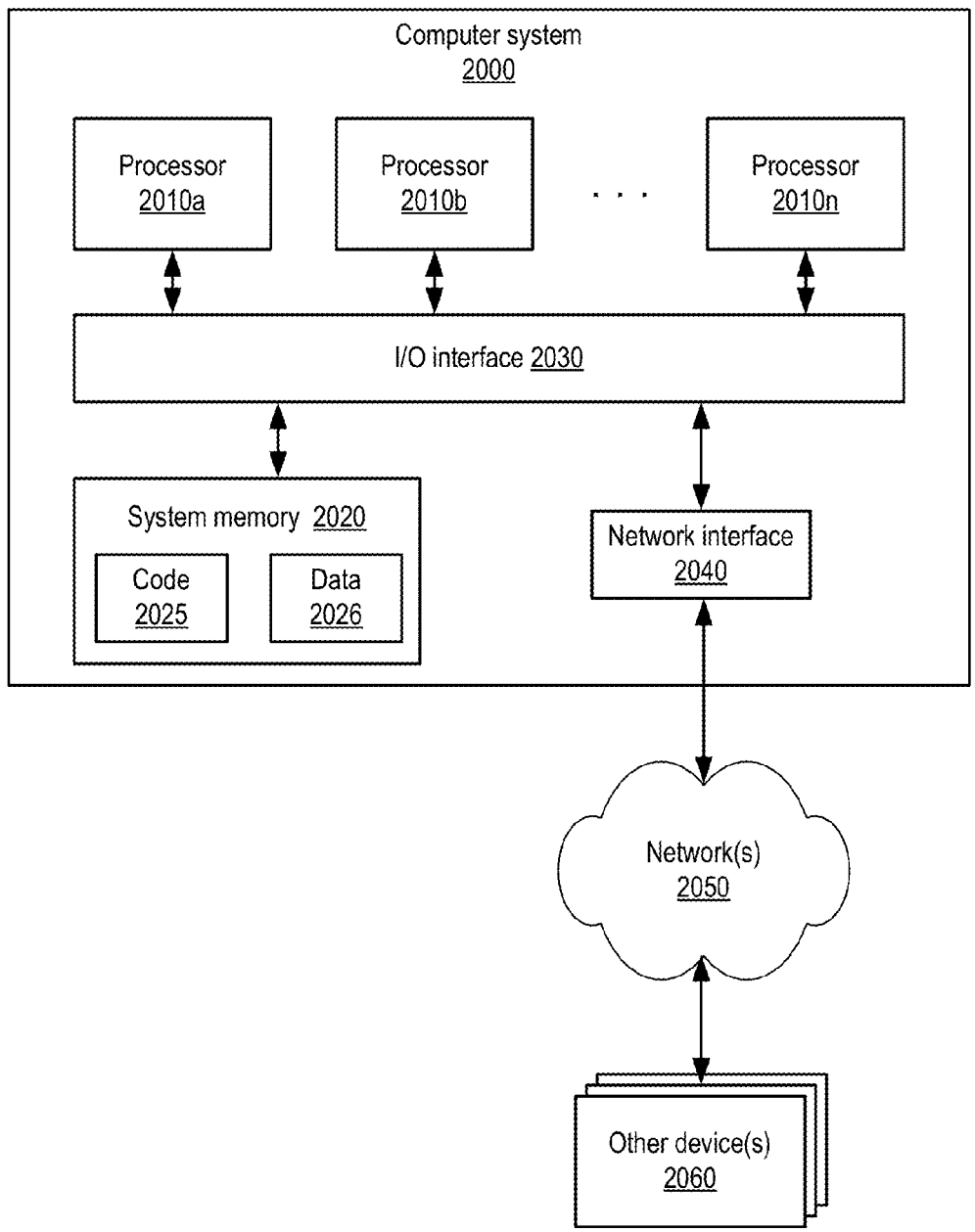
FIG. 11 is a block diagram illustrating an example computer system that may be used in some embodiments.

In at least some embodiments, a server that implements a portion or all of one or more of the technologies, including but not limited to the various service provider methods and apparatus and the methods and apparatus for providing scalable private services in service provider networking environments as described herein, may include a general-purpose computer system that includes or is configured to access one or more computer-accessible media, such as computer system 2000 illustrated in FIG. 11. In the illustrated embodiment, computer system 2000 includes one or more processors 2010 coupled to a system memory 2020 via an input/output (I/O) interface 2030. Computer system 2000 further includes a network interface 2040 coupled to I/O interface 2030.

In various embodiments, computer system 2000 may be a uniprocessor system including one processor 2010, or a multiprocessor system including several processors 2010 (e.g., two, four, eight, or another suitable number). Processors 2010 may be any suitable processors capable of executing instructions. For example, in various embodiments, processors 2010 may be general-purpose or embedded processors implementing any of a variety of instruction set architectures (ISAs), such as the x86, PowerPC, SPARC, or MIPS ISAs, or any other suitable ISA. In multiprocessor systems, each of processors 2010 may commonly, but not necessarily, implement the same ISA.

System memory 2020 may be configured to store instructions and data accessible by processor(s) 2010. In various embodiments, system memory 2020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above for service provider methods and apparatus and the methods and apparatus for providing scalable private services in service provider networking environments, are shown stored within system memory 2020 as code 2025 and data 2026.

In one embodiment, I/O interface 2030 may be configured to coordinate I/O traffic between processor 2010, system memory 2020, and any peripheral devices in the device, including network interface 2040 or other peripheral interfaces. In some embodiments, I/O interface 2030 may perform any necessary protocol, timing or other data transformations to convert data signals from one component (e.g., system memory 2020) into a format suitable for use by another component (e.g., processor 2010). In some embodiments, I/O interface 2030 may include support for devices attached through various types of peripheral buses, such as a variant of the Peripheral Component Interconnect (PCI) bus standard or the Universal Serial Bus (USB) standard, for example. In some embodiments, the function of I/O interface 2030 may be split into two or more separate components, such as a north bridge and a south bridge, for example. Also, in some embodiments some or all of the functionality of I/O interface 2030, such as an interface to system memory 2020, may be incorporated directly into processor 2010.

Network interface 2040 may be configured to allow data to be exchanged between computer system 2000 and other devices 2060 attached to a network or networks 2050, such as other computer systems or devices as illustrated in FIGS. 2 through 4F, for example. In various embodiments, network interface 2040 may support communication via any suitable wired or wireless general data networks, such as types of Ethernet network, for example. Additionally, network interface 2040 may support communication via telecommunications/telephony networks such as analog voice networks or digital fiber communications networks, via storage area networks such as Fibre Channel SANs, or via any other suitable type of network and/or protocol.

In some embodiments, system memory 2020 may be one embodiment of a computer-accessible medium configured to store program instructions and data as described above for FIGS. 2 through 6 for implementing embodiments of service provider methods and apparatus and the methods and apparatus for providing scalable private services in service provider networking environments. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computer system 2000 via I/O interface 2030. A non-transitory computer-accessible storage medium may also include any volatile or non-volatile media such as RAM (e.g. SDRAM, DDR SDRAM, RDRAM, SRAM, etc.), ROM, etc, that may be included in some embodiments of computer system 2000 as system memory 2020 or another type of memory. Further, a computer-accessible medium may include transmission media or signals such as electrical, electromagnetic, or digital signals, conveyed via a communication medium such as a network and/or a wireless link, such as may be implemented via network interface 2040.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc, as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A service provider network, comprising:
a plurality of devices that implement a public instance of a service that provides resources to customers of the service provider network, wherein the resources provided by the public instance of the service are implemented on multi-tenant hardware shared by the customers of the service provider network;
a public API endpoint to the service, wherein the public instance of the service is accessible to the customers of the service provider network via the public API endpoint to access the resources provided to the customers by the public instance of the service;

one or more devices that implement a private instance of the service for a specific customer of the service provider network, wherein one or more resources provided to the specific customer by the private instance of the service are implemented on single-tenant hardware assigned to the specific customer and not shared with other customers of the service provider network; and a private API endpoint to the service, wherein the private instance of the service is accessible to the specific customer via the private API endpoint to access the one or more resources provided to the specific customer by the private instance of the service;

wherein an initial implementation of the private instance of the service is relatively small when compared to the public instance of the service, and wherein the private instance of the service is scalable to support a detected or anticipated increase in usage of the private instance of the service.

2. The service provider network as recited in claim 1, wherein the service is a virtualization service operable to provide resources implemented on devices within the service provider network as virtualized resources to the customers of the service provider network.

3. The service provider network as recited in claim 1, wherein each instance of the service is implemented according to an architecture that defines two or more layers of the service, and wherein at least one layer of the private instance is implemented on single-tenant hardware assigned to the specific customer and not shared with the public instance of the service and at least one other layer of the private instance is implemented on multi-tenant hardware shared with the public instance of the service.

4. A service provider network, comprising:
a plurality of devices that implement a public instance of a service that provides resources to customers of the service provider network, wherein at least some of the resources provided by the public instance of the service are implemented on multi-tenant hardware shared by the customers of the service provider network; and one or more devices that implement a private instance of the service for a specific customer of the service provider network, wherein at least one resource provided to the specific customer by the private instance of the service is implemented on a single-tenant device assigned to the specific customer and not shared with other customers of the service provider network.

5. The service provider network as recited in claim 4, wherein the public instance of the service is accessible to the customers of the service provider network via a public API endpoint to access the resources provided to the customers by the public instance of the service, and wherein the private instance of the service is accessible to the specific customer via a private API endpoint to access one or more resources provided to the specific customer by the private instance of the service.

6. The service provider network as recited in claim 5, wherein the service provider network further comprises a virtualized private network for the specific customer, wherein the virtualized private network includes one or more components of the service provider network assigned to the specific customer, and wherein the private API endpoint is accessible from within the specific customer's virtualized private network.

7. The service provider network as recited in claim 4, wherein the public instance of the service is accessible to the customers of the service provider network via a public API endpoint to access the resources provided to the customers by the public instance of the service, and wherein the private instance of the service is accessible to the specific customer via the public API endpoint to access one or more resources provided to the specific customer by the private instance of the service.

8. The service provider network as recited in claim 4, wherein the service is a virtualization service operable to provide resources implemented on devices within the service provider network as virtualized resources to the customers of the service provider network, wherein the virtualized resources include virtualized computation resources and virtualized storage resources.

9. The service provider network as recited in claim 4, wherein at least one resource provided to the specific customer by the private instance of the service is implemented on multi-tenant hardware shared with the public instance of the service.

10. The service provider network as recited in claim 4, wherein all of the one or more resources provided to the specific customer by the private instance of the service are implemented on single-tenant devices assigned to the specific customer and not shared with other customers of the service provider network.

11. The service provider network as recited in claim 4, wherein at least a portion of network infrastructure of the private instance of the service is not shared with the public instance of the service.

12. The service provider network as recited in claim 4, wherein the private instance of the service and the public instance of the service each include separate instances of one or more processes of the service.

13. The service provider network as recited in claim 4, wherein the service provider network is operable to:
detect or project a change in usage of the private instance; and
direct reconfiguration of the private instance of the service to support the detected or projected change in usage.

14. A method, comprising:
providing, by a service provider network, a public instance of a service that provides resources to customers of the service provider network, wherein the resources provided to the customers are implemented on multi-tenant devices, wherein at least two resources assigned to different customers reside on the same multi-tenant device;
receiving a request for a private instance of the service from a specific customer of the service provider network; and
in response to the request, establishing a private instance of the service for the specific customer, wherein at least one resource provided to the specific customer by the private instance of the service is implemented on a single-tenant device assigned to the specific customer and not shared with other customers of the service provider network.

15. The method as recited in claim 14, wherein the public instance of the service is accessible to the customers of the service provider network via a public API endpoint to access resources provided to the plurality of customers by the public instance of the service, the method further comprising providing a private API endpoint to the specific customer, wherein the private instance of the service is accessible to the specific customer via the private API endpoint to access resources provided to the specific customer by the private instance of the service.

16. The method as recited in claim 14, wherein the service provider network provides an account management user interface to the customers, and wherein said receiving a request for a private instance of the service from a specific customer comprises receiving the request from the specific customer via the account management user interface.

17. The method as recited in claim 14, wherein the service includes two or more layers, and wherein said establishing a private instance of the service for the specific customer comprises:
implementing at least one layer of the private instance on single-tenant hardware assigned to the specific customer and not shared with the public instance of the service; and
implementing at least one other layer of the private instance on multi-tenant hardware shared with the public instance of the service.

18. The method as recited in claim 14, wherein said establishing a private instance of the service for the specific customer comprises implementing the private instance of the service on single-tenant hardware assigned to the specific customer and not shared with the public instance of the service.

19. The method as recited in claim 14, further comprising:
determining that the private instance of the service needs to be reconfigured to support a change in usage of the private instance; and
reconfiguring the private instance of the service to support the change in usage in response to said determining that the private instance of the service needs to be reconfigured.

20. The method as recited in claim 19, wherein said determining that the private instance of the service needs to be reconfigured comprises monitoring one or more usage metrics of the private instance of the service to detect the change in usage.

21. The method as recited in claim 19, wherein said determining that the private instance of the service needs to be reconfigured comprises receiving a request to reconfigure the private instance from the specific customer.

22. A non-transitory computer-accessible storage medium storing program instructions computer-executable to implement:
directing establishment of an initial implementation of a private instance of a service for a specific customer of a service provider network, wherein the private instance of the service is accessible to the specific customer to access resources provided to the specific customer by the private instance of the service, and wherein at least a portion of the private instance of the service is implemented on single-tenant hardware not shared with other customers of the service provider network;
determining that the initial implementation of the private instance of the service needs to be scaled up to support a detected or anticipated increase in usage of the private instance; and
directing reconfiguration of the private instance of the service to scale up the private instance to support the detected or anticipated increase in usage.

23. The non-transitory computer-accessible storage medium as recited in claim 22, wherein said scaling up of the private instance of the service is performed transparently from the perspective of the specific customer.

24. The non-transitory computer-accessible storage medium as recited in claim 22, wherein, in said determining that the initial implementation of the private instance of the service needs to be scaled up to support a detected or anticipated increase in usage of the private instance, the program instructions are computer-executable to implement:
monitoring one or more usage metrics of the private instance of the service; and
detecting that at least one of the one or more usage metrics is above a specified threshold.

25. The non-transitory computer-accessible storage medium as recited in claim 22, wherein the program instructions are further computer-executable to implement:
determining that the private instance of the service can be scaled down to support a detected or projected decrease in usage of the private instance; and
directing reconfiguration of the private instance of the service to scale down the private instance to support the detected or projected decrease in usage.

26. The non-transitory computer-accessible storage medium as recited in claim 25, wherein said scaling down of the private instance of the service is performed transparently from the perspective of the specific customer.

27. The non-transitory computer-accessible storage medium as recited in claim 22, wherein said reconfiguration of the initial implementation of the private instance of the service comprises addition of one or more hardware or software components to the private instance of the service.

28. The non-transitory computer-accessible storage medium as recited in claim 27, wherein said addition of one or more hardware or software components to the private instance of the service comprises addition of one or more single-tenant devices to the private instance of the service.

29. The non-transitory computer-accessible storage medium as recited in claim 22, wherein said reconfiguration of the initial implementation of the private instance of the service comprises replacing or upgrading one or more hardware or software components of the service private instance.

30. The non-transitory computer-accessible storage medium as recited in claim 22, wherein the service provider network implements a public instance of the service, wherein the public instance of the service is accessible to customers of the service provider network via a public API endpoint to access resources provided to the customers by the public instance of the service, wherein the resources provided by the public instance are implemented on multi-tenant hardware shared by the customers of the service provider network.

31. The non-transitory computer-accessible storage medium as recited in claim 30, wherein the service includes two or more layers, and wherein, in said directing establishment of an initial implementation of a private instance of a service for a specific customer of a service provider network, the program instructions are further computer-executable to implement:
directing establishment of at least one layer of the private instance on single-tenant hardware assigned to the specific customer and not shared with the public instance of the service; and
directing establishment of at least one other layer of the private instance on multi-tenant hardware shared with the public instance of the service.

32. The non-transitory computer-accessible storage medium as recited in claim 22, wherein said directing establishment of an initial implementation of a private instance of a service for a specific customer of a service provider network is performed in response to receiving a request for a private instance of the service from the specific customer.

33. The non-transitory computer-accessible storage medium as recited in claim 32, wherein the request specifies an initial configuration for the private instance, wherein the initial implementation is established according to the specified initial configuration.

34. The non-transitory computer-accessible storage medium as recited in claim 32, wherein the request specifies one or more initial usage metrics for the private instance, wherein the program instructions are further computer-executable to implement determining an initial configuration for the private instance according to the specified one or more initial usage metrics for the private instance.

\* \* \* \* \*